United States Patent
Bhushan et al.

(10) Patent No.: US 9,420,606 B2
(45) Date of Patent: Aug. 16, 2016

(54) FULL DUPLEX OPERATION IN A WIRELESS COMMUNICATION NETWORK

(71) Applicant: QUALCOMM Incorporated, San Diego, CA (US)

(72) Inventors: Naga Bhushan, San Diego, CA (US); Tingfang Ji, San Diego, CA (US); Krishna Kiran Mukkavilli, San Diego, CA (US); Joseph Soriaga, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 14/535,745

(22) Filed: Nov. 7, 2014

(65) Prior Publication Data

US 2015/0382375 A1    Dec. 31, 2015

Related U.S. Application Data

(60) Provisional application No. 62/017,182, filed on Jun. 25, 2014.

(51) Int. Cl.
| | |
|---|---|
| *H04B 1/56* | (2006.01) |
| *H04W 72/12* | (2009.01) |
| *H04L 5/00* | (2006.01) |
| *H04L 5/14* | (2006.01) |
| *H04L 5/16* | (2006.01) |
| *H04W 24/08* | (2009.01) |
| *H04W 52/24* | (2009.01) |
| *H04W 72/08* | (2009.01) |

(52) U.S. Cl.
CPC ........ *H04W 72/1289* (2013.01); *H04L 5/0005* (2013.01); *H04L 5/0096* (2013.01); *H04L 5/14* (2013.01); *H04L 5/16* (2013.01); *H04W 24/08* (2013.01); *H04W 52/243* (2013.01); *H04W 72/082* (2013.01); *H04W 72/121* (2013.01)

(58) Field of Classification Search
CPC . H04W 52/243; H04W 24/08; H04W 72/121; H04W 72/082; H04W 72/1289; H04L 5/14; H04L 5/16; H04L 5/0005; H04L 5/0096
USPC .................................. 370/276–293
See application file for complete search history.

(56) References Cited

U.S. PATENT DOCUMENTS

| | | | |
|---|---|---|---|
| 2010/0091725 A1* | 4/2010 | Ishii | H04W 72/1268 370/329 |
| 2010/0105390 A1* | 4/2010 | Ishii | H04W 72/1242 455/436 |
| 2013/0194984 A1 | 8/2013 | Cheng et al. | |

(Continued)

FOREIGN PATENT DOCUMENTS

WO    WO-2013178084 A1    12/2013

OTHER PUBLICATIONS

International Search Report and Written Opinion—PCT/US2015/034271—ISA/EPO—Aug. 13, 2015.

*Primary Examiner* — Thai Hoang
(74) *Attorney, Agent, or Firm* — Loza & Loza LLP

(57) ABSTRACT

Methods, apparatus, and computer software are disclosed for communicating within a wireless communication network including a scheduling entity configured for full duplex communication, and user equipment (UE) configured for half duplex communication. In some examples, one or more UEs may be configured for limited (quasi-) full duplex communication. Some aspects relate to scheduling the UEs, including determining whether co-scheduling of the UEs to share a time-frequency resource is suitable based on one or more factors such as an inter-device path loss.

30 Claims, 22 Drawing Sheets

(56) References Cited

U.S. PATENT DOCUMENTS

| | | | |
|---|---|---|---|
| 2013/0229952 A1* | 9/2013 | Koskinen | H04L 5/16 370/278 |
| 2013/0294372 A1* | 11/2013 | Ishii | H04W 72/0406 370/329 |
| 2014/0169234 A1 | 6/2014 | Zhu et al. | |
| 2014/0342738 A1* | 11/2014 | Ishii | H04W 28/08 455/436 |
| 2015/0085805 A1 | 3/2015 | Li et al. | |
| 2015/0109969 A1* | 4/2015 | Celebi | H04L 5/0085 370/278 |

\* cited by examiner

**Full Duplex Example 1:
Full Duplex Communication with
an upstream node and a downstream node**

**Full Duplex Example 2:
Full Duplex Communication with
an upstream node and a downstream node**

**Full Duplex Example 3:
Full Duplex Communication with
two downstream nodes**

**Full Duplex Example 4:
Full Duplex Communication with
two upstream nodes**

Full Duplex Example 5:
Full Duplex Communication with
a Single Upstream Node

Full Duplex Example 6:
Full Duplex Communication with
a Single Downstream Node

FULL DUPLEX OPERATION IN A WIRELESS COMMUNICATION NETWORK

CROSS-REFERENCE TO RELATED APPLICATIONS

This application claims priority to and the benefit of provisional patent application No. 62/017,182, filed in the United States Patent and Trademark Office on Jun. 25, 2014, the entire content of which is incorporated herein by reference as if fully set forth below and for all applicable purposes.

TECHNICAL FIELD

Aspects of the present disclosure relate generally to wireless communication systems, and more particularly, to scheduling algorithms for wireless communication systems that combine full duplex nodes and half duplex nodes.

BACKGROUND

Wireless communication networks are widely deployed to provide various communication services such as telephony, video, data, messaging, broadcasts, and so on. Such networks, which are usually multiple access networks, support communications for multiple users by sharing the available network resources. In many networks, resources are allocated for bi-directional communication utilizing either time division duplexing (TDD) or frequency division duplexing (FDD). In either TDD or FDD, communication utilizing a single frequency channel is only possible in one direction at any given instant of time. Thus, TDD and FDD networks implement full duplex functionality by either utilizing multiple frequency channels, as in the case of FDD, or by dividing the two directions of communication according to allocated time slots, as in the case of TDD.

Recently, with technological improvements to interference cancellation techniques, true radio level full duplex communication is feasible, where bi-directional communication between devices occurs utilizing a single frequency channel, and at the same time. As the demand for mobile broadband access continues to increase, research and development continue to advance wireless communication technologies not only to meet the growing demand for mobile broadband access, but to advance and enhance the user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Some aspects of the present disclosure provide for methods, apparatus, and computer software for communicating within a wireless communication network including a scheduling entity, configured for full duplex communication, and user equipment (UE), configured for half duplex communication. In some examples, one or more UEs may be configured for limited (quasi-) full duplex communication. Some aspects relate to scheduling the UEs, including determining whether co-scheduling of the UEs to share a time-frequency resource is suitable based on one or more factors such as an inter-device path loss.

In one aspect, the disclosure provides a network node configured for wireless communication, including at least one processor, a computer-readable medium communicatively coupled to the at least one processor, and a transceiver communicatively coupled to the at least one processor. Here, the at least one processor may be configured to utilize the transceiver to communicate with a first device and a second device, by utilizing half duplex communication with each of the first device and the second device, to determine an inter-device path loss between a first device and a second device, and to co-schedule the first device and the second device to utilize a first time-frequency resource if an inter-device path loss between the first device and the second device is greater than a threshold.

Another aspect of the disclosure provides a method of wireless communication operable at a network node. Here, the method includes communicating with a first device and a second device, by utilizing half duplex communication with each of the first device and the second device, determining an inter-device path loss between a first device and a second device, and co-scheduling the first device and the second device to utilize a first time-frequency resource if an inter-device path loss between the first device and the second device is greater than a threshold.

Another aspect of the disclosure provides a UE configured for wireless communication, including at least one processor, a computer-readable medium communicatively coupled to the at least one processor, and a transceiver communicatively coupled to the at least one processor. Here, the at least one processor may be configured to utilize the transceiver to communicate with a network node utilizing half duplex communication, to utilize the transceiver to receive an interference discovery signal from an interfering UE, to utilize the transceiver to transmit an interference report to the network node corresponding to a strength of the received interference discovery signal, and to utilize the transceiver to receive a resource allocation from the network node, wherein the resource allocation is co-scheduled with the interfering UE only if a path loss, corresponding to the strength of the received interference discovery signal, is greater than a threshold.

Another aspect of the disclosure provides a method of wireless communication operable at a UE. Here, the method includes communicating with a network node utilizing half duplex communication, receiving an interference discovery signal from an interfering UE, transmitting an interference report to the network node corresponding to a strength of the received interference discovery signal, and receiving a resource allocation from the network node, wherein the resource allocation is co-scheduled with the interfering UE only if a path loss, corresponding to the strength of the received interference discovery signal, is greater than a threshold.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
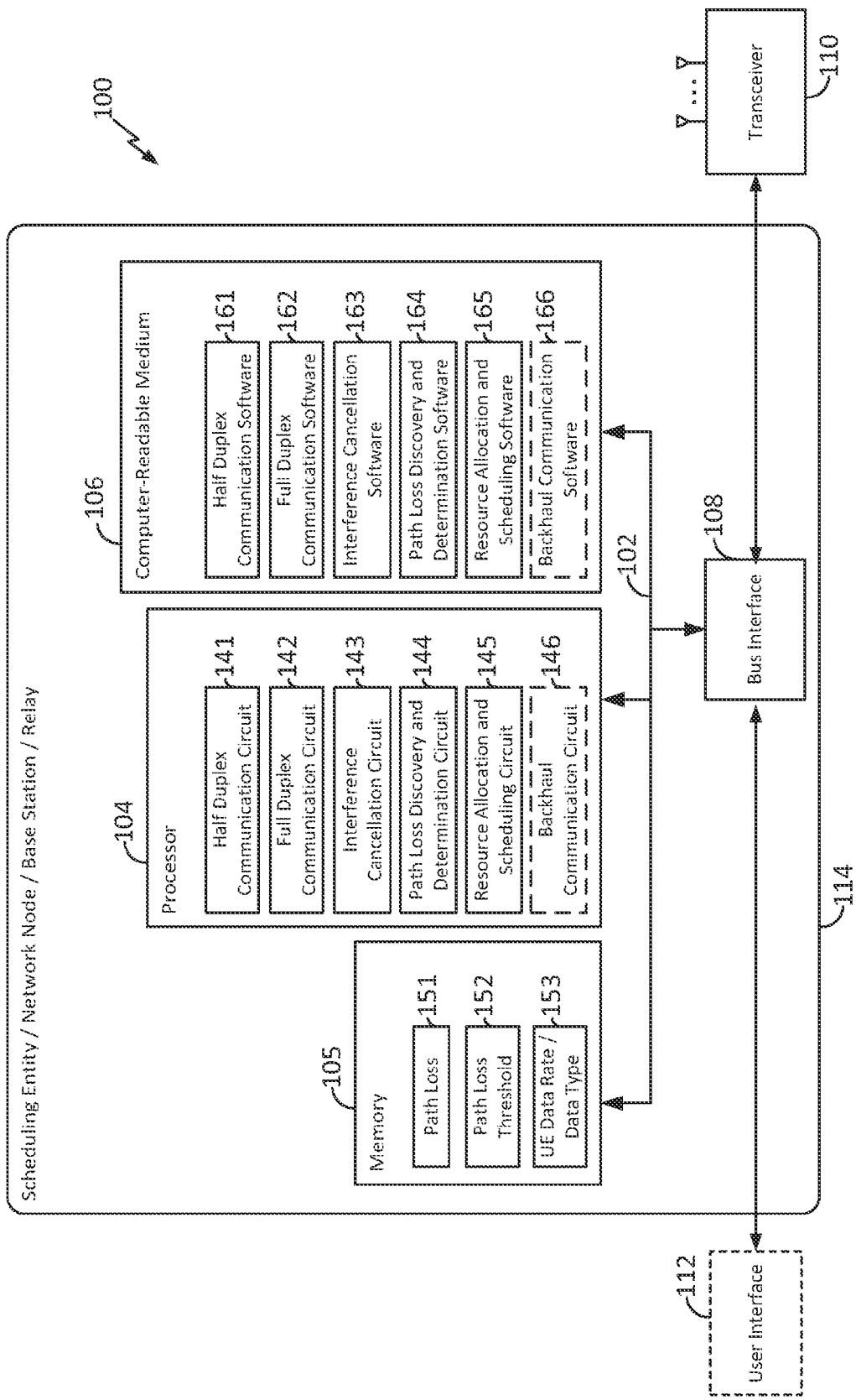
FIG. 1 is a block diagram illustrating an example of a hardware implementation for a scheduling entity employing a processing system according to some embodiments.

FIG. 1 is a block diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a scheduling entity, network node, base station (BS), or relay, as illustrated in any of FIGS. 3, 5, 9, 10, 12, 14, 15, 16, 17, 18, 19, 20, 21, and/or 22. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes described below.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. In various examples, the transceiver 110 may include one or more antennas, and in multi-antenna examples, may be enabled to determine an angle from which a received signal arrives. The transceiver 110 may include various sub-components configured to enable wireless communication, including but not limited to one or more power amplifiers, a transmitter, a receiver, filters, oscillators, etc. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described below for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In various aspects of the disclosure, the processor 104 may include a half duplex communication circuit 141, which may function in coordination with half duplex communication software 161. Here, the half duplex communication circuit 141 and/or software 161 may utilize the transceiver 110 to enable communication with one or more devices (e.g., UEs 200, described further below) utilizing half duplex communication techniques, such as time division duplexing (TDD) and/or frequency division duplexing (FDD).

The processor 104 may further include a full duplex communication circuit 142, which may function in coordination with full duplex communication software 162. Here, the full duplex communication circuit 141 and/or software 161 may enable full duplex communication with one or more devices (e.g., UEs 200) utilizing a single frequency channel. In some examples, the full duplex communication circuit 141 may function in coordination with the interference cancellation circuit 143.

That is, the processor 104 may further include an interference cancellation circuit 143, which may function in coordination with interference cancellation software 163. Here, the interference cancellation circuit 143 and/or software 163 may be configured to enable automatic interference cancellation at the transceiver 110, which may function to cancel intra-device interference (e.g., self-interference). The interference cancellation circuit 143 and/or software 163 may utilize any suitable interference cancellation algorithm or technique, including but not limited to antenna/RF isolation, transmit signal reconstruction and cancellation (e.g., using a digital baseband signal and/or transceiver output signal, channel response estimation, transceiver non-linearity modeling etc.), power amplifier noise cancellation, etc. In some examples, the interference cancellation circuit 143 and/or software 163 may further function to cancel inter-device interference. That is, interference with one or more other transmitting devices. The interference cancellation circuit 143 and/or software 163 may include any suitable filter or equalizer configured for interference cancellation.

The processor 104 may further include a path loss discovery and determination circuit 144, which may function in coordination with path loss discovery and determination software 164. Here, the path loss discovery and determination circuit 144 and/or software 164 may enable determination of an inter-device path loss between pairs of devices (e.g., UEs 200) in accordance with one or more factors or parameters such as the distance between the respective devices; may enable determination and storing of a path loss value 151 between a single device (e.g., a UE 200) and the network node/scheduling entity 100; and, in some examples, may enable determination of the distance between a pair of UEs utilizing one or more algorithms as described in detail herein below, and accordingly, determination of a path loss between the UEs based on the determined distance. Further, the path loss discovery and determination circuit 144 and/or software 164 may compare a determined inter-device path loss with a path loss threshold 152 to make various determinations, e.g., whether to co-schedule pairs of UEs to share time-frequency resources.

The processor 104 may further include a resource allocation and scheduling circuit 145, which may function in coordination with resource allocation and scheduling software 165. Here, the resource allocation and scheduling circuit 154 and/or software 165 may allocate resources for one or more devices (e.g., UEs 200) to utilize for communication with the network node/scheduling entity 100, and/or for communication between UEs (e.g., for interference discovery signals); it may select a resource for allocation utilizing any suitable resource selection scheme, including but not limited to random selection, or selection corresponding to an identifier unique to the respective devices; it may schedule time-frequency resources for one or more devices (e.g., UEs 200) to utilize; and it may determine whether to co-schedule two or more devices (e.g., UEs 200) to utilize the same time-frequency resource based on one or more factors or parameters, such as if their inter-device path loss is greater than a path loss threshold 151, based on a path loss between the respective devices and the network node/scheduling entity 100, and/or based on a data rate and/or data type 153 utilized by the respective devices. Further, the resource allocation and scheduling circuit 145 and/or software 165 may function in coordination with the transceiver 110, to transmit resource allocation signals to devices (e.g., UEs 200).

The processor 104 may further include an optional backhaul communication circuit 146, which may function in coordination with an optional backhaul communication software 166. Here, the backhaul communication circuit 146 and/or software 166 may enable communication with an upstream node utilizing any suitable wired or wireless backhaul communication interface. The backhaul communication circuit 146 and/or software 166 are optional, and may generally be included in examples wherein the network node/scheduling entity 100 is a relay node, described in further detail below.

Figure 2:
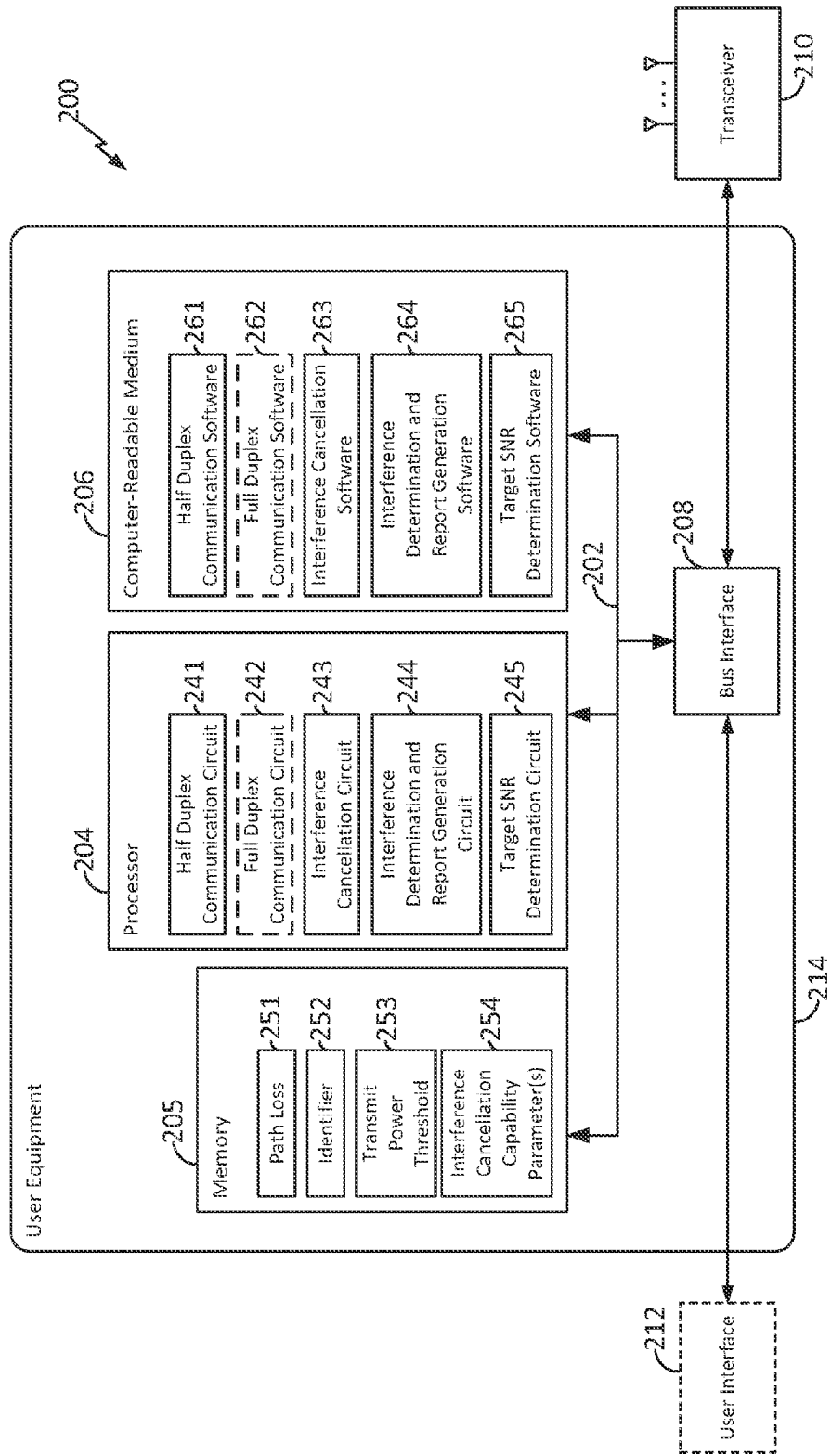
FIG. 2 is a block diagram illustrating an example of a hardware implementation for a user equipment (UE) employing a processing system according to some embodiments.

FIG. 2 is a block diagram illustrating an example of a hardware implementation for an apparatus 200 employing a processing system 214. In accordance with various aspects of the disclosure, an element, or any portion of an element, or any combination of elements may be implemented with a processing system 214 that includes one or more processors 204. For example, the apparatus 200 may be a user equipment (UE) as illustrated in any of FIGS. 3, 5, 9, 10, 12, 14, 15, 16, 17, 18, 19, 20, 21, and/or 22. The apparatus 200 has many components the same as or similar to those described above in relation to FIG. 1. For example, a bus 202, a bus interface 208, a transceiver 210, and a user interface 212, are substantially the same as those described above in relation to FIG. 1. Furthermore, processor 204, the memory 205, and the computer-readable medium 206 have many similarities to those so-named components described above in relation to FIG. 1, except for the differences described herein below.

That is, in various aspects of the disclosure, the processor 204 may include a half duplex communication circuit 241, which may function in coordination with half duplex software 261. Here, the half duplex communication circuit 241 and/or software 261 may utilize the transceiver 210 to enable communication with one or more devices utilizing half duplex communication techniques, such as time division duplexing (TDD) and/or frequency division duplexing (FDD).

The processor 204 may further include a full duplex communication circuit 242, which may function in coordination with full duplex communication software 262. Here, the full duplex communication circuit 242 and/or software 262 may function in coordination with the interference cancellation circuit 243 and/or software 262, described below, to enable full duplex communication with one or more devices utilizing a single frequency channel. Accordingly, the full duplex communication circuit 242 and/or software 262 may enable full duplex communication, for example, if a configured transmit power is less than a transmit power threshold 253. In some examples, the full duplex communication circuit 242 and/or software 262 may be optional, and some UEs may lack such full duplex communication capabilities.

The processor 204 may further include an interference cancellation circuit 243, which may function in coordination with interference cancellation software 263. Here, the interference cancellation circuit 243 and/or software 263 may enable interference cancellation (e.g., automatic interference cancellation), e.g., functioning to cancel intra-device interference (e.g., self interference) and/or functioning to cancel inter-device interference. Further the interference cancellation circuit 243 and/or software 263 may include any suitable filter or equalizer configured for interference cancellation.

The processor 204 may further include an interference determination and report generation circuit 244, which may function in coordination with interference determination and report generation software 264. Here, the interference determination and report generation circuit 244 and/or software 264 may enable determination of an interference level corresponding to an interfering device (e.g., by determining a strength of a received interference discovery signal from the interfering device), and may accordingly generate and transmits (e.g., utilizing the transceiver 210) an interference report to the network node/scheduling entity 100, based on the determined interference level. Further, the interference determination and report generation circuit 244 and/or software 264 may calculate and store a path loss value 251, which may be included in the transmitted report.

The processor 204 may further include a target SNR determination circuit 245, which may function in coordination with target SNR determination software 265. Here, the target SNR determination circuit 245 and/or software 265 may enable a determination of a signal-to-noise ratio (SNR), and/or a signal-to-interference-and-noise ratio (SINR), and may compare the determined SNR/SINR to a target SNR/SINR for the purpose of enabling full duplex communication based on the SNR/SINR.

INTRODUCTION

In wireless communication systems, communication devices can exhibit full duplex or half duplex functionality. With half duplex operation, communication is only possible in one direction at a time on a particular channel, generally being time-divided between segments in one direction or the other direction. This is frequently referred to as time division duplexing (TDD). With full duplex operation, simultaneous communication to and from a device is possible.

In currently deployed systems, full duplex functionality is generally enabled by utilizing frequency division duplexing (FDD), wherein one frequency band is used for communication in one direction, and another frequency band is used for communication in the other direction. In these deployments, although the communication may be full duplex in time, it remains half duplex in the frequency domain, since communication remains only in one direction on each channel.

A communication node that is truly full duplex at the radio level utilizes the same frequency channel to transmit and receive signals simultaneously in time. In the description that follows, the term full duplex is used to refer to radio level full duplex operation on the same frequency channel at the same time. Furthermore, in the disclosure that follows, both time and frequency division duplexing systems (TDD and FDD) are regarded as radio level half duplex systems.

Recently, due in part to improvements in active interference cancellation technology, radio level full duplex functionality, wherein full duplex communication may be achieved utilizing a single frequency channel, is possible with high reliability. In such a system, it may be the case where some wireless nodes (e.g., a base station, eNodeB, access point, scheduling entity, etc.) may be configured with full duplex radios for true radio level full duplex functionality, whereas some other nodes (e.g., wireless devices, UEs, subordinate entities, etc.) may be configured only with half duplex radios for half duplex functionality at the radio level.

Furthermore, some radios in such a system may have partial and/or conditional full duplex capabilities, e.g., wherein they utilize only half duplex functionality unless certain conditions are satisfied.

Figure 3:
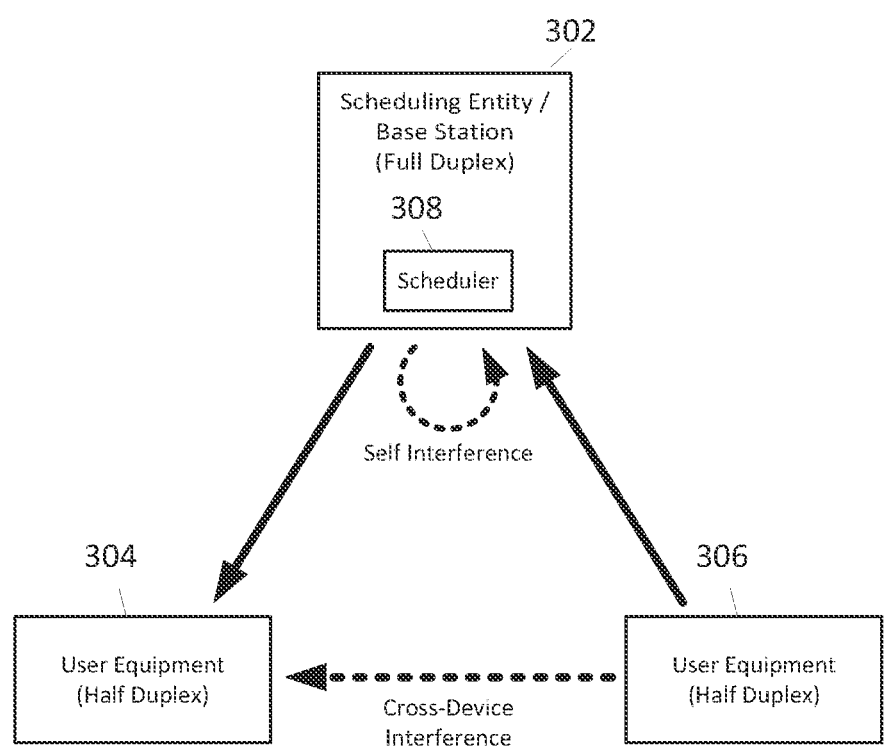
FIG. 3 is a block diagram illustrating an example of a wireless communication network including a full duplex scheduling entity and half duplex UEs according to some embodiments.

FIG. 3 is a simplified block diagram illustrating an exemplary wireless communication network with a base station 302 capable of full duplex functionality in communication with two UEs 304 and 306 that are only capable of half duplex communication. In the illustration, the base station 302 is illustrated transmitting a downlink signal to a first UE 304, and at the same time, receiving an uplink signal from a second UE 306.

In such a network, where full duplex nodes communicate with half duplex nodes, interference between the half duplex nodes can become problematic. For example, as illustrated in the scenario in FIG. 3, the first UE 304 and the second UE 306 are co-scheduled, such that the first UE 304 is allocated a particular resource to utilize for receiving downlink signals, and the second UE 306 is allocated that same particular resource to utilize for transmitting uplink signals. In this case, co-scheduling the UEs can cause the transmission from the second UE 306 to produce cross-device interference that affects the receiving performance of the first UE 304. In such a wireless communication system, a scheduling entity 308 at the base station 302 (e.g., a scheduler at the medium access control or MAC layer) or any other suitable scheduling node would benefit from taking suitable precautions to mitigate such cross-UE interference when the base station 302 or other scheduling node is operating in full duplex mode. For example, such cross-device interference may be reduced when a path loss between the UEs is large. Accordingly, various aspects of the present disclosure explore methods by which a base station may choose UEs to be co-scheduled based, for example, on a path loss between the respective UEs. Further aspects of the disclosure consider data rates to assign to the transmitter and receiver links at the base station when co-scheduling such UEs.

Therefore, in one or more aspects of the disclosure, a wireless communication network may be configured to choose a pair of UEs with a sufficiently large inter-UE path loss, so that a scheduling node or base station may transmit to one UE and receive from the other UE utilizing the same time-frequency resource, while reducing or avoiding cross-device interference between the respective UEs. In various aspects of the disclosure, several methods or algorithms to determine the inter-UE path loss are presented. The base station or scheduling node may further choose the UEs such that their path loss to the base station is small enough to sustain the required link SINR, and/or may determine the data rate or data type (traffic vs. control) to use for each of the two links, so that the SINR targets may be met by both links of the full duplex configuration.

Figure 4:
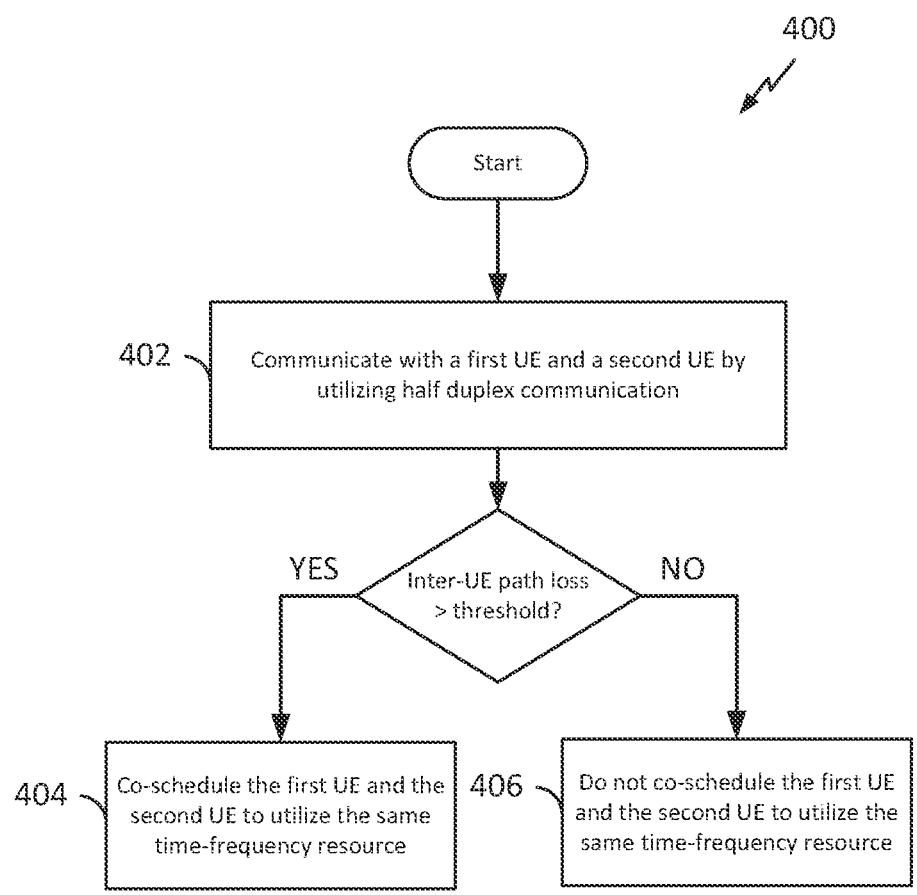
FIG. 4 is a flow chart illustrating a process for determining whether to co-schedule a pair of UEs in a time-frequency resource according to some embodiments.

FIG. 4 is a flow chart illustrating an exemplary process 400 for determining whether to co-schedule a given pair of UEs in accordance with one or more aspects of the present disclosure. In some examples, the process 400 may be carried out by a network node such as a scheduling entity 100 and/or a processing system 114 as described above and illustrated in FIG. 1. In some examples the process 400 may be carried out by any suitable means for implementing the described functions.

At block 402, the scheduling entity 100 may communicate with a first device (e.g., a UE 200) and a second device (e.g., a UE 200) by utilizing half duplex communication with each of the first device and the second device. Here, the scheduling entity 100 may determine an inter-device path loss between the first device and the second device, utilizing any suitable inter-device path loss discovery algorithm, method, or technique. Several such inter-device path loss algorithms are described below. If the discovered inter-UE path loss is high (e.g., being greater than some suitable path loss threshold), then the process may proceed to block 404. Here, the scheduling entity 100 may co-schedule the first device and the second device to utilize the same time-frequency resource. On the other hand, if the discovered inter-UE path loss is low (e.g., not being greater than the path loss threshold), then the process may proceed to block 406. Here, the scheduling entity 100 may not co-schedule the first device and the second device to utilize the same time-frequency resource.

Discovery of Inter-UE Path Loss

In accordance with one or more aspects of the disclosure, a network node, base station, or other scheduling entity (hereafter referred to as a scheduling entity) may be enabled to discover an inter-UE path loss. Here, a path loss may be an attenuation of a signal from transmission to receipt. That is, due to one or more factors or conditions, the power or energy of a signal when it is received at a receiving device may be less than the power or energy of the signal when it is transmitted from a transmitting device. This change is generally referred to as a path loss. In various embodiments, any one or more of a number of techniques, methods, or algorithms may be utilized for discovery of inter-UE or inter-device path loss. By taking the path loss into account, two or more co-scheduled UEs (e.g., at least one UE scheduled for transmission and at least one other UE scheduled for reception utilizing the same time-frequency resource) may cause a suitably low amount of cross-device interference such that their simultaneous scheduling is possible. For example, the inter-UE path loss may be correlated with the distance between the respective UEs, e.g., being proportional to the fourth power of the distance between the UEs. Further, the inter-UE path loss may be affected by other potentially random phenomena, such as shadowing. In general, if two UEs are close to one another, then the cross-device interference may be high; but if the two UEs are far enough apart from one another, then the cross-device interference may be suitably low.

Figure 5:
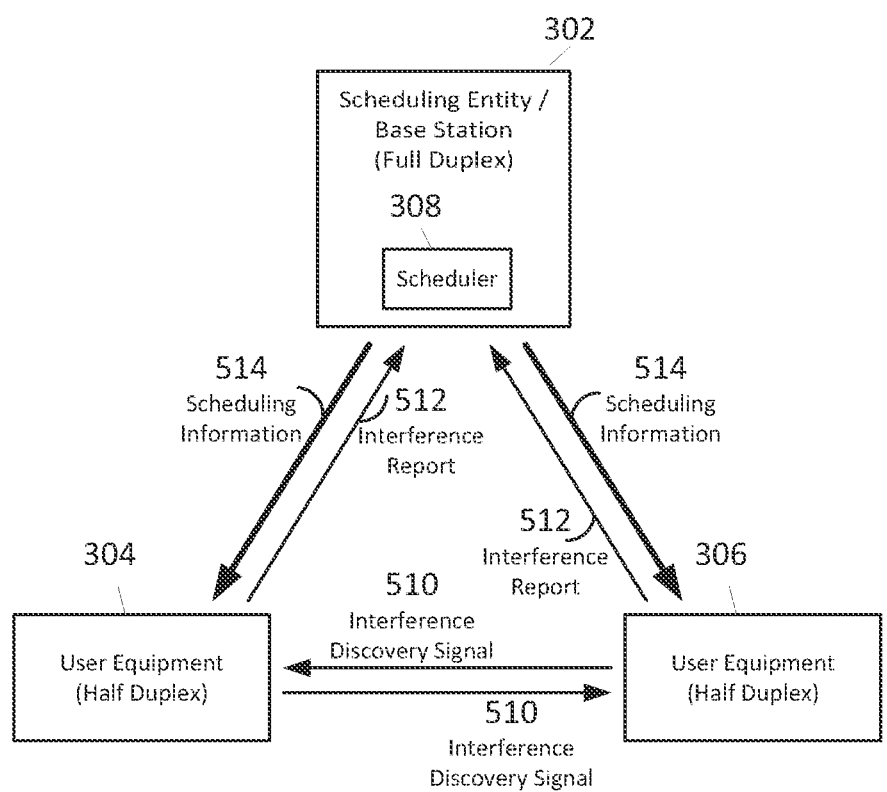
FIG. 5 is a block diagram illustrating an example of a wireless communication network including a full duplex scheduling entity and half duplex UEs with interference discovery and interference report signaling, according to some embodiments.

In one example, with reference to FIG. 5, in order to discover the inter-UE path loss at least one of the UEs (e.g., the second UE 306) may transmit a pilot signal, a reference signal, or any other suitable interference discovery signal 510, while another UE (e.g., the first UE 304) may detect and/or measure the strength of the received interference discovery signal 510. In some aspects, the first UE 304 may transmit an interference report 512 including one or more factors such as a signal strength of the received interference discovery signal 510 back to the base station or scheduling entity 302. Here, the scheduling entity 302 may already have knowledge of the transmit power of the transmitted interference discovery signal 510, e.g., because the transmit power is dictated by the scheduling entity 302, or the transmit power is reported to the scheduling entity 302 by the transmitting UE 306. Therefore, the path loss between the first UE 304 and the second UE 306 may be determined by the scheduling entity 302, by determining the difference between the received signal strength reported by the receiving UE 304 and the actual transmit power utilized by the transmitting UE 306. Accordingly, in some examples, if the determined path loss, and/or the value of the receive power reported by the UE 304, is too low (e.g., below a suitable path loss threshold) or too high (e.g., above a suitable path loss threshold), then the corresponding pair of UEs may be eliminated as candidates for co-scheduled full duplex operation at the scheduling entity 302. That is, in various aspects of the disclosure, the scheduling entity 302 may determine whether to co-schedule a given pair of UEs, corresponding to a particular time-frequency resource, in accordance with the determined or discovered inter-UE path loss between that given pair of UEs.

Resource Allocation for Interference Discovery

In some examples, such as (but not limited to) large networks where many UEs are served by a base station or other scheduling entity, certain resources may be dedicated specifically for cross-device interference discovery. For example, in an aspect of the disclosure, a subset (e.g., half) of the UEs in the network may be configured to send pilot/discovery signals at a given discovery time-slot, while the remaining UEs may be instructed to look for these signals, and to report the strength of each discovery signal that is detected, to the base station. Here, each transmitting UE may be assigned a unique signal resource (e.g., a unique time-frequency allocation) on which to send its discovery signal/pilot/reference signal with specified transmit power.

In a further aspect of the disclosure, the subset of UEs scheduled to transmit pilot/discovery signals may be changed (e.g., randomly) over subsequent discovery time slot(s), e.g., until the path loss between each pair of proximate UEs can be determined As an alternative to random selection of UEs that transmit on a given interference discovery slot, in another aspect of the disclosure, each UE may be assigned a unique tag, which may be based on an identifier 252 stored at the UE, such as its MAC ID and/or its radio network temporary identifier (RNTI). Here, as one example, a UE 306 may transmit its interference discovery signal 510 during an i-th discovery time slot if the i-th bit of its unique tag is '1', and may listen for interference discovery signals from other UEs if the i-th bit of its unique tag is zero.

After transmitting and receiving interference discovery signals, each UE may report the source and strength of each pilot/discovery signal it received during the corresponding discovery time slots. Accordingly, the base station or scheduling entity may avoid pairing UEs whose mutual path loss is determined to be too low. In this way, the various UEs in the network can be enabled to withstand cross-UE interference during full duplex data transfer at the scheduling entity.

Figure 6:
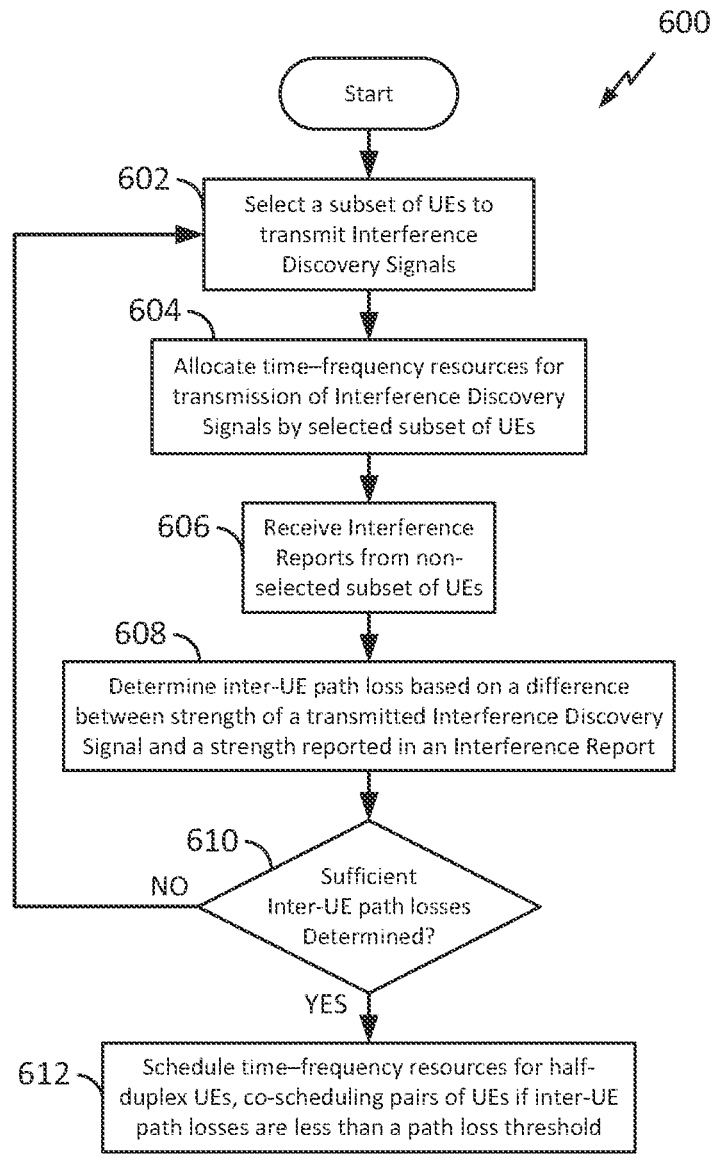
FIG. 6 is a flow chart illustrating a process for interference discovery and co-scheduling UEs according to some embodiments.

FIG. 6 is a flow chart illustrating an exemplary process 600 for allocating resources for inter-device interference discovery in accordance with some aspects of the present disclosure. In some examples, the process 600 may be carried out by a network node such as a scheduling entity 100 and/or a processing system 114 as described above and illustrated in FIG. 1. In some examples the process 600 may be carried out by any suitable means for implementing the described functions.

At block 602, a scheduling entity 100 may select a subset of devices (e.g., UEs 200) from among a plurality of devices, to transmit interference discovery signals. In some examples, the subset may be half of the devices connected to the scheduling entity 100. Further, in some examples, the subset may be randomly selected from among the devices connected to the scheduling entity 100, or in other examples, may be selected based on other suitable criteria such as a device tag or identifier. At block 604, the scheduling entity 100 may allocate a time-frequency resource for selected subset of devices to utilize for the transmission of interference discovery signals. Accordingly, the selected devices may utilize the allocated resource and may discover inter-device interference between pairs of devices. Further, one or more devices (e.g., the non-selected subset of devices), which receives the interference discovery signals, may transmit suitable interference reports back to the scheduling entity.

At block 606, the scheduling entity 100 may receive the interference report from the one or more devices (e.g., the non-selected subset of devices), and at block 608, the scheduling entity 100 may determine the inter-device path loss. Here, for example, the inter-device path loss may be based on a difference between the strength of a transmitted interference discovery signal (which may be known to the scheduling entity 100), and a strength reported in the interference report.

At block 610, the scheduling entity 100 may determine whether sufficient inter-device path losses have been determined. That is, decisionmaking as to whether time-frequency resources may be co-scheduled to two or more UEs may be improved when larger numbers of inter-UE path loss combinations among the connected UEs are available. If sufficient inter-device path losses have not yet been determined, the process may return, e.g., to block 602 and further interference discovery may be implemented. On the other hand, if sufficient inter-device path losses have been determined by the scheduling entity 100, then the process may proceed to block 612, wherein the scheduling entity 100 may schedule time-frequency resources for half-duplex devices. Here, the scheduling entity 100 may co-schedule pairs of devices if the inter-device path loss between that pair of devices is low (e.g., being less than a suitable path loss threshold).

Measuring RF Signals for Discovering Inter-UE Path Loss

Referring once again to FIG. 5, according to another aspect of the disclosure, to discover inter-device path loss, the scheduling entity 302 may be configured to schedule multiple UEs for data/control transmission, or any suitable interference discovery signal 510, on separate time-frequency resources. Here, UEs that are not scheduled for interference discovery signal 510 transmission utilizing a particular time-frequency resource may be instructed to measure the energy received in each time-frequency resource, and to transmit an interference report 512 corresponding to this measurement. In this way, based on the particular time-frequency resource being reported on, the scheduling entity 302 may know the identity of the UE that transmitted an interference discovery signal 510 using that resource. Furthermore, based on the identity of the reporting UE and the reported signal strength of a given time-frequency resource, the scheduling entity 302 may determine the path loss between a corresponding pair of UEs. That is, the scheduling entity 302 may determine the inter-UE path loss between a pair of UEs by determining a difference between a known strength of a transmitted interference discovery signal 510, transmitted utilizing a predetermined time-frequency resource that identifies the transmitting UE, and a report strength of the received interference discovery signal 510. Here, the identity of the reporting UE may be determined based on any suitable information, e.g., contained in the interference report 512 transmitted by the reporting UE.

In a related example, to better facilitate the determination of cross-device interference across all UEs in the network, the scheduling entity 302 may change (e.g., randomly change) the subset of UEs transmitting data/control over sequential time slots or other suitable time durations. Accordingly, as described above, over time the path loss between any pair of UEs may be determined by the scheduling entity 302.

In yet another example, rather than relying on the scheduling entity 302 to use the time-frequency location of the interference discovery signals 510 to identify the UE that transmits the signal, the transmitting UEs may actively tag their respective interference discovery signals 510 with their own identity (e.g., a MAC ID/RNTI/UE-Id/UE-signature). In various examples, such tagging may involve the inclusion of the MAC ID or other suitable identifier as part of a packet header within the interference discovery signal 510. In another example, such tagging may involve using a UE-specific sequence to scramble at least part of the interference discovery signal 510. Here, the receiving UE may include the same, or corresponding information in its interference report 512, so that the scheduling entity 302 knows the identity of the UE that transmitted the interference discovery signal 510.

Figure 7:
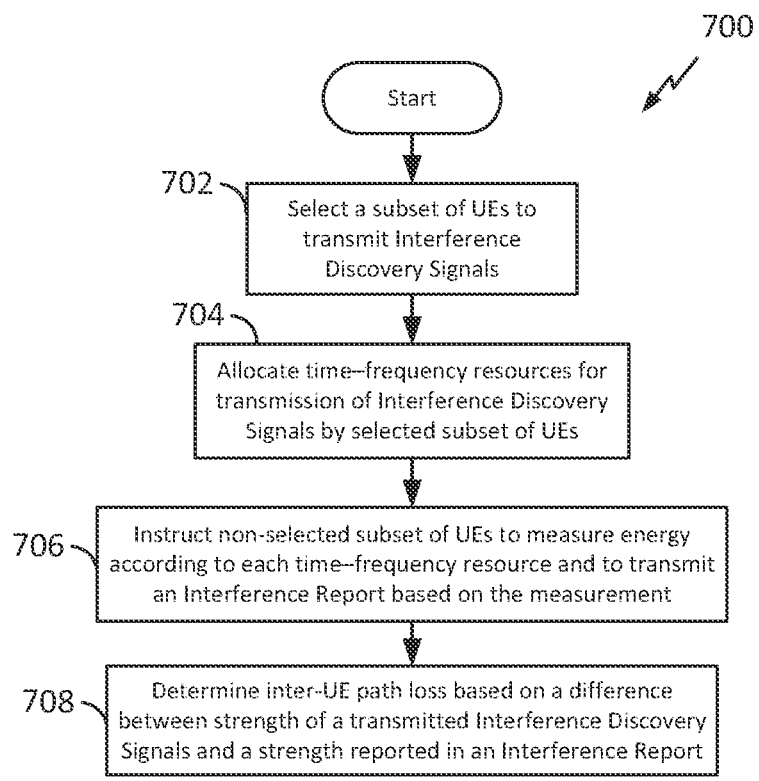
FIG. 7 is a flow chart illustrating another process for interference discovery and co-scheduling UEs according to some embodiments.

FIG. 7 is a flow chart illustrating an exemplary process 700 for allocating resources for inter-device interference discovery in accordance with some aspects of the present disclosure. In some examples, the process 700 may be carried out by a network node such as a scheduling entity 100 and/or a processing system 114 as described above and illustrated in FIG. 1. In some examples the process 700 may be carried out by any suitable means for implementing the described functions.

At block 702, a network node such as a scheduling entity 100 may select a subset of devices (e.g., UEs 200) to transmit interference discovery signals, and at block 704, the scheduling entity 100 may allocate time-frequency resources for the selected subset of devices to utilize to transmit interference discovery signals.

At block 706, the scheduling entity 100 may instruct one or more devices (e.g., the non-selected subset of UEs) to measure energy according to selected time-frequency resources (e.g., each time-frequency resource), and to transmit an interference report based on their respective measurements. Accordingly, the devices may transmit their interference reports back to the scheduling entity. Then, at block 708, the scheduling entity 100 may determine an inter-device path loss, based on a difference between a strength of a transmitted interference discovery signal (which may be known to the scheduling entity 100), and the strength reported in the interference report.

Using Geographic Information to Infer Path Loss

In accordance with some aspects of the disclosure, a determination of the path loss between a pair of UEs may be made indirectly, or may be inferred, based on a determination of the distance between the respective UEs. Accordingly, the geographic distance between the UEs may be used to determine if the inter-UE path loss is high enough for full duplex co-scheduling. As a simple example, if the geographic distance between two UEs is sufficiently large (e.g., greater than a predetermined threshold), then their path loss may be considered guaranteed to be high enough for co-scheduling. On the other hand, if the geographic distance between two UEs is relatively small (e.g., less than the threshold), then their path loss may or may not be high enough. In this case, in some aspects of the disclosure, an explicit path loss estimation, as described above (e.g., utilizing interference discovery) may be used to determine inter-UE path losses.

Various approaches may be utilized within the scope of the present disclosure to determine the distance between a pair of UEs. As one example, each UE (e.g., the pair of UEs) may provide a scheduling entity 302 with its respective global positioning satellite (GPS) coordinates. Accordingly, the distance between the two can be directly calculated. In another example, one or both UEs in a pair may be in fixed locations, which may be recorded in a database. Such stationary UEs are frequently found as sensors, alarm systems, meters, or other static machine-type communication devices. With stationary UEs, a database lookup from the base station may be used instead of real-time GPS information, to determine the location of the respective stationary UE or UEs. Accordingly, as above, the distance between the two can be directly calculated. Here, if the distance between the two UEs is large enough then the UEs may be co-scheduled to utilize a time-frequency resource for full duplex communication.

In yet another example, crowd-sourcing of data may be used to infer RF isolation (i.e., whether a sufficiently large inter-UE path loss exists) between a pair of UEs of interest, based on their geographic location. For instance, if two (or more) other UEs at locations close to a given pair of UEs have previously reported a large path loss between them (e.g., through RF measurements or discovery, as described above), then the given pair of UEs may also be considered to be eligible for co-scheduling.

Figure 8:
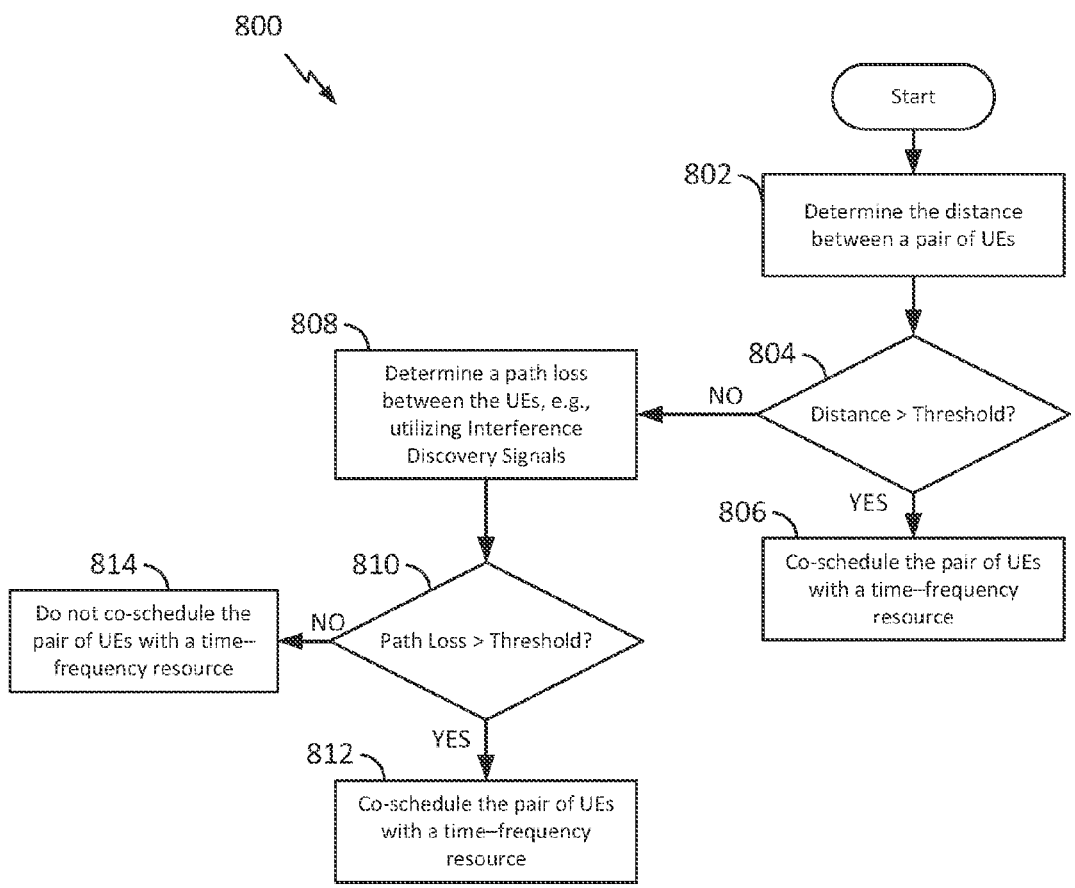
FIG. 8 is a flow chart illustrating a process for utilizing an inter-UE distance to determine an inter-UE path loss and co-scheduling UEs according to some embodiments.

FIG. 8 is a flow chart illustrating an exemplary process 800 for utilizing geographic information to infer the inter-device interference between devices in accordance with some aspects of the present disclosure. In some examples, the process 800 may be carried out by a network node such as a scheduling entity 100 and/or a processing system 114 as described above and illustrated in FIG. 1. In some examples the process 800 may be carried out by any suitable means for implementing the described functions.

At block 802, a device (e.g., a scheduling entity 100) may determine the distance between a pair of wireless devices (e.g., a pair of UEs 200) utilizing any suitable means, some of which are described above. At block 804, the scheduling entity 100 may determine whether the distance between the UEs is greater than a suitable distance threshold. If the distance between the UEs is great enough, then it may be inferred that the inter-device interference is great enough for co-scheduling. Accordingly, the process may proceed to block 806, wherein the scheduling entity 100 may so-schedule the pair of UEs to share a time-frequency resource.

On the other hand, if the distance between the UEs is not great enough (e.g., not greater than the distance threshold), then the process may proceed to block 808 wherein the scheduling entity may utilize any other suitable means, technique, or algorithm to explicitly determine a path loss between the UEs. For example, any one or more of the interference discovery algorithms described above may be utilized, e.g., implementing suitable signaling between the respective UEs, to discover their inter-device path loss.

At block 810, the scheduling entity 100 may determine if the determined inter-device path loss is large (e.g., greater than a path loss threshold). If the inter-device path loss is large, then the process may proceed to block 812 and the scheduling entity 100 may co-schedule the pair of UEs to share a time-frequency resource. On the other hand, if the inter-device path loss is small (e.g., not greater than the path loss threshold), then the process may proceed to block 814 wherein the scheduling entity 100 may not co-schedule the pair of UEs to share the time-frequency resource.

Using Polar Coordinates to Find Geographic Information

Based on uplink transmissions, a scheduling entity 302 may determine the approximate distance between itself and a UE. For example, the scheduling entity 302 may estimate a round trip delay (RTD). RTD estimation is used in existing systems to provide uplink timing corrections to the UE, so details of the performance or determination of the RTD estimation are not described in detail in the present disclosure. In essence, a timer at the scheduling entity determines the time from transmission of a signal to the UE, until a response is received from the UE, corresponding to a round trip. Furthermore, a scheduling entity 302 with multiple receive antennas (e.g., see transceiver 110/210 in FIGS. 1/2) may be enabled to estimate the angle of arrival of the signals from a given UE, based on multiple observations of the signal received on the uplink. In some examples, multiple observations may be used to filter out any effect of small-scale fading and noise. Based on the range of two UEs, and their differential angle of arrival, the scheduling entity 302 may calculate a lower bound of the distance between the two UEs.

Figure 9:
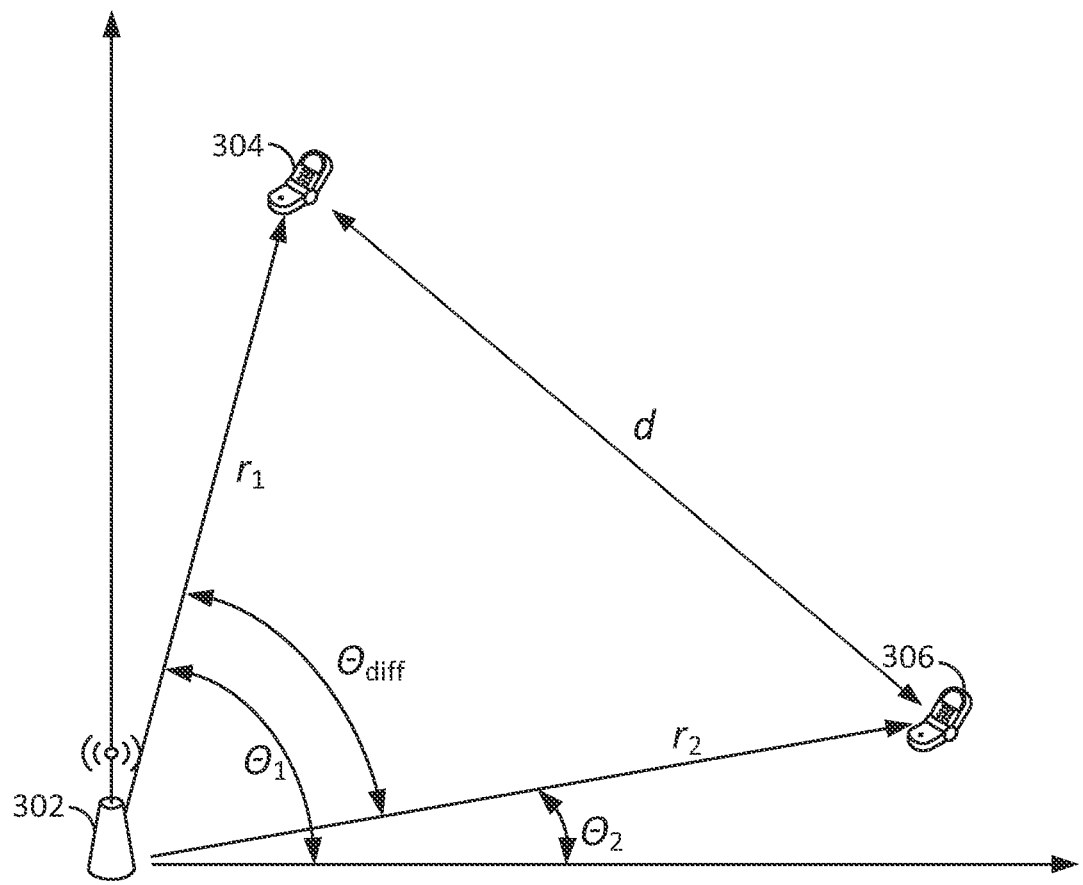
FIG. 9 is a schematic illustration showing the use of radial coordinates to determine an inter-UE distance according to some embodiments.

For example, FIG. 9 is a schematic illustration of a wireless communication network including a scheduling entity 302, a first UE 304, and a second UE 306, as viewed from overhead (e.g., a bird's-eye view). For example, if the UEs 304 and 306 are estimated to be at distance $r_1$ and $r_2$ from the scheduling entity 302, and their angles of arrival $\theta_1$ and $\theta_2$ differ by at least $\theta_{diff}$, then a triangle rule may be used to obtain a lower bound for the distance d between the two UEs according to the following equation:

$$d \geq \text{sqrt}(r_1^2 + r_2^2 - 2r_1 r_2 \cos \theta_{diff})$$

That is, according to the inequality given above, it may be determined that the distance between a given pair of UEs 304 and 306 is greater than or equal to a predetermined threshold, and accordingly, inferred that the path loss between the respective UEs is great enough for co-scheduling of time-frequency resources. In some examples, for a given angular separation $\theta_{diff}$, the scheduling entity 302 may set a threshold on the distances $r_1$ and $r_2$. That is, if both $r_1$ and $r_2$ exceed a certain threshold, the UEs 304 and 306 may be considered to be far enough apart for full duplex co-scheduling. As an alternative, the scheduling entity 302 may use an estimate of its own path loss to the two UEs as a proxy for its own distance from the UEs.

Accordingly, in various aspects of the disclosure, by determining geographic information of a pair of UEs, the path loss between those UEs can be inferred, and accordingly, co-scheduling of those UEs can be planned based on whether inter-UE interference would be problematic.

Recap of Full Duplex MAC and Path Loss Determination

As described above, the choice of co-scheduled UEs for full duplex operation (at a scheduling entity) may utilize knowledge of the path loss between the scheduling entity and the two UEs, as well as the path loss between the two UEs to be co-scheduled. As mentioned before, the inter-UE-path loss (i.e., the RF proximity) between a pair of UEs may be determined explicitly using UE-to-UE discovery signals (or other data/control signals). Furthermore, UE-to-scheduling entity pilot/sounding/reference signals may be reused for UE-to-UE path loss discovery as well. In other aspects of the disclosure, specialized discovery signals and/or mechanisms may be employed, which could also be leveraged for other purposes such as proximity/service discovery, direct communication between UEs, etc.

The path loss between the scheduling entity 302 and a given UE may be measured using any of the techniques currently used in cellular systems, including but not limited to downlink RSRP measurements and reporting by the UEs, RACH/sounding reference signal transmissions by the UE and measurements at the scheduling entity, etc.

A lack of geographic proximity, as determined by any suitable positioning/ranging technique, such as GPS, may also be used to infer that the path loss between two UEs is large enough for full duplex co-scheduling. In some examples, the RF proximity may be determined explicitly only among those UE pairs for which geographic proximity estimates do not necessarily imply a large path loss.

SINR Analysis

As briefly discussed above, a full duplex-capable scheduling entity 302 may be configured with a degree of self-interference suppression. Suppose, for the discussion that follows, that a given scheduling entity 302 is capable of suppressing X dB worth of self-interference at its receiver. The value of X may be determined by the complexity and effectiveness of the selected set of self-interference suppression measures taken at a particular scheduling entity 302. In various aspects of the disclosure, self-interference suppression may be realized at a scheduling entity 302 through any of various suitable means. As one example, a scheduling entity 302 may utilize one or more of antenna/RF isolation, transmit signal reconstruction and cancellation (e.g., using a digital baseband signal and/or transceiver output signal, channel response estimation, transceiver non-linearity modeling etc.), power amplifier noise cancellation, etc.

Figure 10:
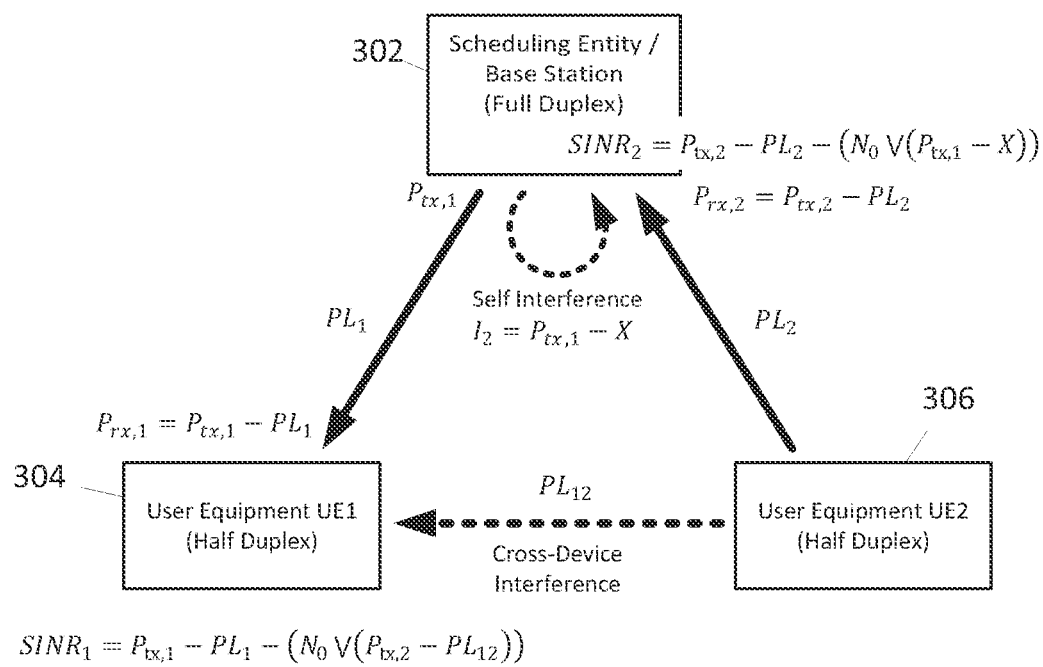
FIG. 10 is a block diagram illustrating an example of a wireless communication network including a full duplex base station and half duplex UEs with additional detail of signal parameters according to some embodiments.

FIG. 10 is a block diagram illustrating the same network as discussed above and illustrated in FIG. 3, but in FIG. 10, additional information such as values corresponding to the transmit power values and path losses are shown. In FIG. 10:

$P_{tx,1}$ represents the transmitted power from the scheduling entity 302;

$P_{tx,2}$ represents the transmitted power from UE2, 306;

$P_{rx,1}$ represents the received power at UE1, 304, corresponding to the transmission from the scheduling entity 302;

$I_2$ represents self-interference at the scheduling entity 302;

$I_{12}$ represents the cross-device interference power received at UE1, 304, corresponding to the transmission from UE2, 306;

$PL_1$ represents the path loss corresponding to a transmission from the scheduling entity 302 to UE1, 304;

$PL_2$ represents the path loss corresponding to a transmission from UE2, 306, to the scheduling entity 302;

$PL_{12}$ represents the path loss corresponding to a transmission from UE2, 306, to UE1, 304;

$SINR_1$ represents the SINR detected at UE1, 304;

$SINR_2$ represents the SINR detected at the scheduling entity 302;

X represents the magnitude of interference suppression at the scheduling entity 302; and $N_0$ represents noise.

In an aspect of the present disclosure, a signal-to-interference and noise ratio (SINR) that may be achieved at the two receivers (i.e., UE1, 304 and the scheduling entity 302) may be calculated as shown. In these calculations, the V operator denotes the linear addition of dB values. That is:

$$x \lor y \equiv 10 \log_{10}\left(10^{\frac{x}{10}} + 10^{\frac{y}{10}}\right) =$$

$$\max(x, y) + 10 \log_{10}\left(1 + 10^{-\frac{|x-y|}{10}}\right) \leq \max(x, y) + 3.011.$$

In an aspect of the disclosure, the SINR at each receiver (i.e., UE1, 304 and the scheduling entity 302) may be required to satisfy a minimum requirement:

$$SINR_1 \geq SINR_{1,min} \text{ and } SINR_2 \geq SINR_{2,min}.$$

The minimum value of the scheduling entity 302 transmit power may be given by:

$$SINR_1 = P_{tx,1} - PL_1 - (N_0 V(P_{tx,2} - PL_{12})) = SINR_{1,min}.$$

$$P_{tx,1} = SINR_{1,min} + PL_1 + (N_0 V(P_{tx,2} - PL_{12})). \quad (1)$$

With this choice of $P_{tx,1}$, the parameters of the second link may be required to satisfy the inequality:

$$P_{tx,2,max} \geq P_{tx,2} \geq SINR_{2,min} + PL_2 + (N_0 V(SINR_{1,min} + PL_1 + (N_0 V(P_{tx,2} - PL_{12})) - X)). \quad (2)$$

In the above inequality, $P_{tx,2,max}$ denotes the peak transmit power capability of the device UE2, 306. If the two co-scheduled UEs 304 and 306 are sufficiently far apart, so as to ensure that $P_{tx,2} - PL_{12} < N_0$, or equivalently, $$PL_{12} > P_{tx,2} - N_0, \quad (2.5)$$

then it is sufficient for $P_{tx,2,max}$ to satisfy the inequality:

$$P_{tx,2,max} \geq P_{tx,2} \geq SINR_{2,min} + PL_2 + (N_0 V(SINR_{1,min} + PL_1 + N_0 + 3.011 - X)). \quad (3)$$

To summarize, a MAC/scheduler at the full duplex scheduling entity 302 may choose the two co-scheduled UEs so as to comply with certain feasibility conditions, particularly as described in inequalities (2.5) and (3). Clearly, by these equations and inequalities, a larger value of X (which corresponds to a better self-interference cancellation capability at the scheduling entity 302) reduces the right-hand side, and eases the transmit power requirement on UE2, 306. For a fixed value of X (which may be determined by hardware capabilities of the scheduling entity 302), the right-hand side of the inequalities may be decreased by increasing either $PL_1$, $PL_2$, $SINR_{1,min}$ or $SINR_{2,min}$.

Full Duplex MAC Principles

Modification of the above parameters can be utilized to control desired features of such a full duplex system. For example, reducing $PL_1$ amounts to transmitting to a UE (e.g., UE1, 304) that is closer to the scheduling entity 302, so that the scheduling entity 302 transmit power may be reduced, thereby reducing self-interference at its own receiver. Reducing $PL_2$ amounts to receiving from a UE (e.g., UE2, 306) that is closer to the scheduling entity 302, so that the strength of the desired signal at the scheduling entity 302 receiver is high, which provides better immunity to self-interference. Reducing $SINR_1$ amounts to serving low-rate data or control signals such as ACK/CQI/Grant (rather than high-rate data) to a UE (e.g., UE1, 304) during full duplex operation. Reducing $SINR_2$ amounts to receiving low-rate user data or control signals such as ACK/CQI/REQ (rather than high-rate user data) from a UE (e.g., UE2, 306) during full duplex operation. Furthermore, using a full duplex capability to maintain "always-on" control channels can enable low latency data transfer for interactive/delay-sensitive applications.

Each of the above involves a degree of compromise that goes along with operation in a full duplex mode. For example, the lower the value of X, the higher the degree of compromise that the scheduler (e.g., at the MAC layer at the scheduling entity 302) may to resort to during full duplex operation. In some aspects of the disclosure, the scheduling entity 302 may fall back to half duplex operation while serving UEs at a cell edge (e.g., high PL), or serving high-rate data (e.g., high SINR) in either direction.

Exact Analysis

The description given above relies in part on the approximation $(x \lor y) \le \max(x, y) + 3.022$. In the description that follows, the exact set of conditions are described under which full duplex operation is possible. That is, based on the SINR analysis, the minimum transmit power at the scheduling entity 302 and UE2, 306 may satisfy the following:

$$SINR_{1,min} + PL_1 + (N_0 V(P_{tx,2} - PL_{12})) \le P_{tx,1} \le P_{tx,1,max} \quad (1')$$

$$SINR_{2,min} + PL_2 + (N_0 V(P_{tx,2} - X)) \le P_{tx,2} \le P_{tx,2,max} \quad (2')$$

The above two equations may be solved simultaneously, provided the following conditions are satisfied:

$$D = X + PL_{12} - (SINR_{1,min} + SINR_{2,min} + PL_1 + PL_2) > 0;$$

$$SINR_{1,min} + PL_1 + N_0 + (0 V(SINR_{2,min} + PL_2 - PL_{12})) - 10\log_{10}(1 - 10^{-D/10}) \le P_{tx,1,max}; \text{ and}$$

$$SINR_{2,min} + PL_2 + N_0 + (0 V(SINR_{1,min} + PL_1 - X)) - 10\log_{10}(1 - 10^{-D/10}) \le P_{tx,2,max}.$$

The left-hand side of the last two inequalities are in fact the minimum required transmit power ($P_{tx,1}$, $P_{tx,2}$) at the two nodes.

As before, feasibility conditions for co-scheduling are facilitated by reducing one or more of $SINR_{1,min}$, $SINR_{2,min}$, $PL_1$, or $PL_2$, or by increasing one or more of $PL_{12}$ or X. The scheduler (e.g., the MAC at the scheduling entity 302) may increase/decrease the path loss through user selection, and may decrease the minimum SINR requirement through data rate/type/format (i.e., data vs. control) selection.

Improving the Effective Value of Self-Interference Factor X, or the Cross Interference Path Loss $PL_{12}$ In some aspects of the disclosure, co-scheduling of UEs may include not only utilizing the same time-frequency resource, but more broadly, a quasi-full duplex mode may be utilized, wherein co-scheduled UEs may utilize different frequency channels or sub-bands, within the same band.

Suppose the feasibility conditions for co-scheduling (as described above) are violated for a given choice of UEs to pair (e.g., UE1, 304 and UE2, 306) and a given choice of target SINRs ($SINR_{1,min}$ and $SINR_{2,min}$). In this case, full duplex operation on the same channel is still possible, but it may be worth considering to schedule the two links on different channels in the same band. That is, one or more aspects of the present disclosure may utilize a quasi-full duplex operation, where the transmit and receive links at a given node reside on different channels (or sub-bands) on the same band. In this case, certain adjacent channel leakage ratio (ACLR) requirements at the transmitter and adjacent channel suppression (ACS) requirements at the receiver can boost the effective value of X at the scheduling entity 302, and the effective value of $PL_{12}$ at UE1, 304. Furthermore, the feasibility conditions may be met with these improved values of X and $PL_{12}$. In this case, in some aspects of the disclosure, the MAC at the scheduling entity 302 may choose to co-schedule the UEs in a quasi-full duplex mode.

To summarize, the scheduler (e.g., a MAC entity at the scheduling entity 302) may make a choice of co-scheduled UEs and data-rate/type for each link. To this end, the base station may first determine if the feasibility conditions for full duplex operation are met. If so, the two links may be scheduled in full duplex mode. Otherwise, the MAC at the scheduling entity may determine if the feasibility conditions for quasi-full duplex operation are met. If so, the two links may be scheduled in quasi-full duplex mode. Otherwise, the two links may be scheduled in different time-slots or bands (i.e., half duplex).

Upon determining two or more feasible configurations, possibly involving multiple UE pairs and data-rate configurations, the scheduling entity 302 may determine a utility metric associated with each feasible configuration, and choose the configuration with the best utility metric.

Figure 11:
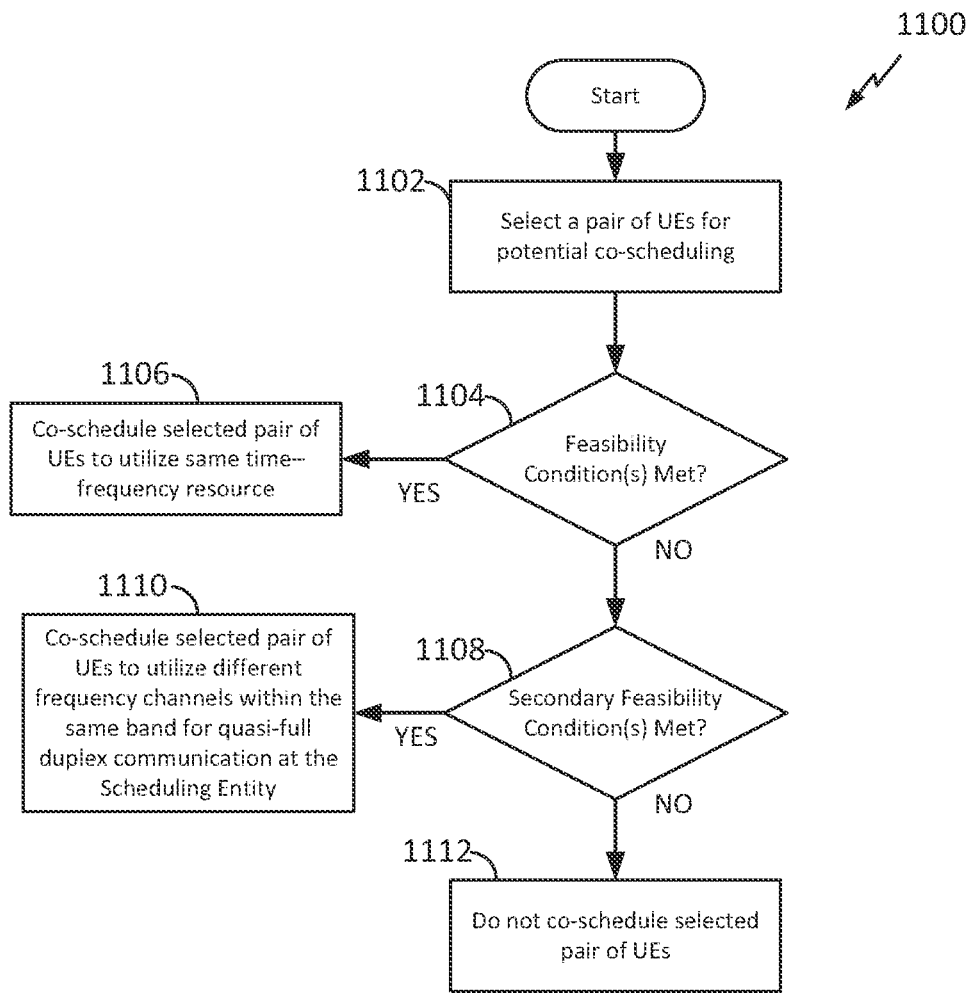
FIG. 11 is a flow chart illustrating a process for determining whether to implement quasi-full duplex communication at a scheduling entity according to feasibility conditions, according to some embodiments.

FIG. 11 is a flow chart illustrating an exemplary process 1100 for co-scheduling devices based on certain feasibility conditions in accordance with one or more aspects of the present disclosure. In some examples, the process 1100 may be carried out by a network node such as a scheduling entity 100 and/or a processing system 114 as described above and illustrated in FIG. 1. In some examples the process 1100 may be carried out by any suitable means for implementing the described functions.

At block 1102, a first device (e.g., a scheduling entity 100) may select a pair of wireless devices (e.g., UEs 200) for potential co-scheduling, and at block 1104, the scheduling entity 100 may determine whether one or more primary feasibility conditions are met. These feasibility conditions for co-scheduling are described throughout the present disclosure, and include, for example, a geographic distance between UEs or an explicit inter-device interference value between UEs. If the primary feasibility conditions are satisfied, then the process may proceed to block 1106, wherein the scheduling entity 100 may co-schedule the selected pair of UEs to utilize the same time-frequency resource. On the other hand, if the primary feasibility conditions are not satisfied, then the process may proceed to block 1108 wherein the scheduling entity 100 may determine whether one or more secondary feasibility conditions are met. These feasibility conditions for co-scheduling are described throughout the present disclosure, and include, for example, a geographic distance between UEs or an inter-device interference value between UEs. As one simple example, the primary feasibility conditions at block 1104 may correspond to first threshold values, and the secondary feasibility conditions at block 1108 may be second threshold values, with more inter-device interference tolerance than the first threshold values. If the secondary feasibility conditions are satisfied, then the process may proceed to block 1110, wherein the scheduling entity 100 may implement a quasi-full duplex option, wherein the selected pair of UEs are co-scheduled to utilize different frequency channels within the same band. Here, if even the secondary feasibility conditions are not satisfied, then the process may proceed to block 1112 wherein the scheduling entity 100 may determine not to co-schedule the selected pair of UEs.

Limited Full Duplex Capability at a UE

Figure 12:
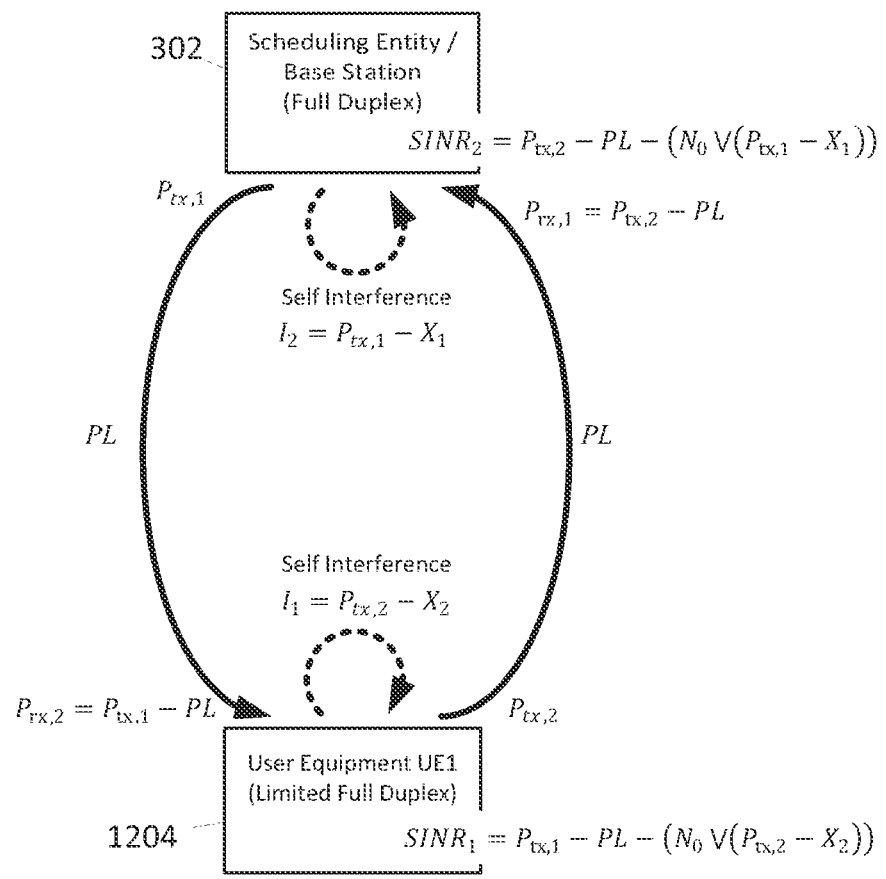
FIG. 12 is a block diagram illustrating an example of a wireless communication network including a full duplex base station and a limited full duplex UE according to some embodiments.

In the description above, while the scheduling entity 302 has been described as being capable of full duplex communication, the UEs 304 and 306 have been assumed only to be capable of half duplex communication. However, in other aspects of the disclosure, one or more UEs in the wireless communication system may be capable of supporting full duplex operation, at least to a limited extent. For example, FIG. 12 is a block diagram illustrating a scheduling entity 302 configured for full duplex communication, and a UE 1204, configured for limited full duplex communication. In an aspect of the disclosure, the UE 1204 may be capable of full duplex communication when there exists a small value for the self-inference-cancellation factor X.

That is, in some aspects of the disclosure, one or more UEs such as the UE 1204 may support full duplex operation, e.g., as long as their transmit power is low (e.g., below a suitable threshold). For example, at a lower transmit power, the UE 1204 may be able to bypass its power amplifier, thereby reducing or eliminating the need to compensate for distortions and noise introduced by the power amplifier.

Here, if a full duplex scheduling entity 302 serves a UE 1204 with such limited full duplex capability, the same UE 1204 may be scheduled in both directions (i.e., downlink and uplink) at the same time. In this case, the UE 1204 may transmit at the lowest possible power that yields the target SINR at the scheduling entity 302 receiver. Further, the scheduling entity 302 may transmit at a power high enough to ensure that the UE 1204 receiver achieves the desired SINR, despite any partial leakage from its own transmission.

If the transmit power at the scheduling entity 302 exceeds its capability, the scheduling entity 302 may switch to a lower transmission rate, which reduces the required SINR. The scheduling entity may choose the highest possible data rate for which the target SINR may be met without exceeding its transmit power capabilities.

Alternatively, the scheduling entity 302 may select a lower data rate at which to receive data from the UE 1204, which results in a lower transmit power from the UE 1204. This, in turn, translates to lower self-interference at the UE 1204.

FIG. 12 illustrates the following parameters in a network with a UE 1204 capable of limited full duplex functionality. In the illustration:

$P_{tx,1}$ corresponds to the power of the signal transmitted from the scheduling entity 302.

$P_{tx,2}$ corresponds to the power of the signal transmitted from the UE 1204.

PL corresponds to the path loss between the scheduling entity 302 and the UE 1204.

$P_{rx,1}$ corresponds to the power received at the scheduling entity 302. Here, $P_{rx,1} = P_{tx,2} - PL$.

$P_{rx,2}$ corresponds to the power received at the UE 1204. Here, $P_{rx,2} = P_{tx,1} - PL$.

$X_1$ represents the self-interference cancellation capability at the scheduling entity 302.

$X_2$ represents the self-interference cancellation capability at the UE 1204.

$I_2$ corresponds to the self-interference at the scheduling entity 302, taking account of its self-interference cancellation capability. That is, $I_2 = P_{tx,1} - X_1$.

$I_1$ corresponds to the self-interference at the UE 1204, taking account of its self-interference cancellation capability. That is, $I_1 = P_{tx,2} - X_2$.

$SINR_1$ corresponds to the SINR at the UE 1204.

$SINR_2$ corresponds to the SINR at the scheduling entity 302.

Here, $SINR_1 = P_{tx,1} - PL - (N_0 V(P_{tx,2} - X_2))$; and $SINR_2 = P_{tx,2} - PL - (N_0 V(P_{tx,1} - X_1))$. In an aspect of the disclosure, full duplex capabilities at the UE 1204 may be enabled under certain conditions relating to one or both of $SINR_1$ and/or $SINR_2$, e.g., whether one or both are at or above given threshold values. For example, full duplex may be enabled when $SINR_1 \geq SINR_{1,min}$; and when $SINR_2 \geq SINR_{2,min}$.

Feasibility Conditions for Full Duplex Operation with a Single UE

Based on the SINR analysis, the minimum transmit power at the scheduling entity 302 and the UE 1204 (with reference to FIG. 12) may satisfy the following equations:

$$P_{tx,1} = SINR_{1,min} + PL + (N_0 V(P_{tx,2} - X_2)) \leq P_{tx,1,max} \quad (1'')$$

$$P_{tx,2} = SINR_{2,min} + PL + (N_0 V(P_{tx,1} - X_1)) \leq P_{tx,2,max} \quad (2'')$$

The above two equations may be solved simultaneously, provided that:

$$D = X_1 + X_2 - (SINR_{1,min} + SINR_{2,min} + 2PL) > 0;$$

$$SINR_{1,min} + PL + N_0 + (0V(SINR_{2,min} + PL - X_2) - 10 \log_{10}(1 - 10^{-D/10}) \leq P_{tx,1,max}; \text{ and}$$

$$SINR_{2,min} + PL + N_0 + (0V(SINR_{1,min} + PL - X_1) - 10 \log_{10}(1 - 10^{-D/10}) \leq P_{tx,2,max}.$$

The left-hand side of the last two inequalities above is in fact the minimum transmit power at the two nodes. Feasibility conditions for enabling limited full duplex functionality at the UE 1204 are facilitated by reducing one or more of $SINR_{1,min}$, $SINR_{2,min}$, or PL, or by increasing one or more of $X_1$ or $X_2$. The scheduling entity 302 may increase or decrease the path loss PL through user selection, and may decrease the minimum SINR requirement through data rate/type/format (i.e., data vs. control) selection.

Here, if the self-interference rejection capability at the UE 1204 ($X_2$) is much smaller than that at the scheduling entity 302 ($X_1$), then for similar link SINRs, the required transmit power at the scheduling entity 302 ($P_{tx,1}$) is beneficially much smaller than that at the UE 1204 ($P_{tx,2}$).

In a further aspect of the disclosure, the scheduling entity 302 may also increase the effective values of $X_1$ and/or $X_2$ by choosing to operate in quasi-full duplex mode, wherein the two links assigned to different channels/sub-channels on the same band.

Figure 13:
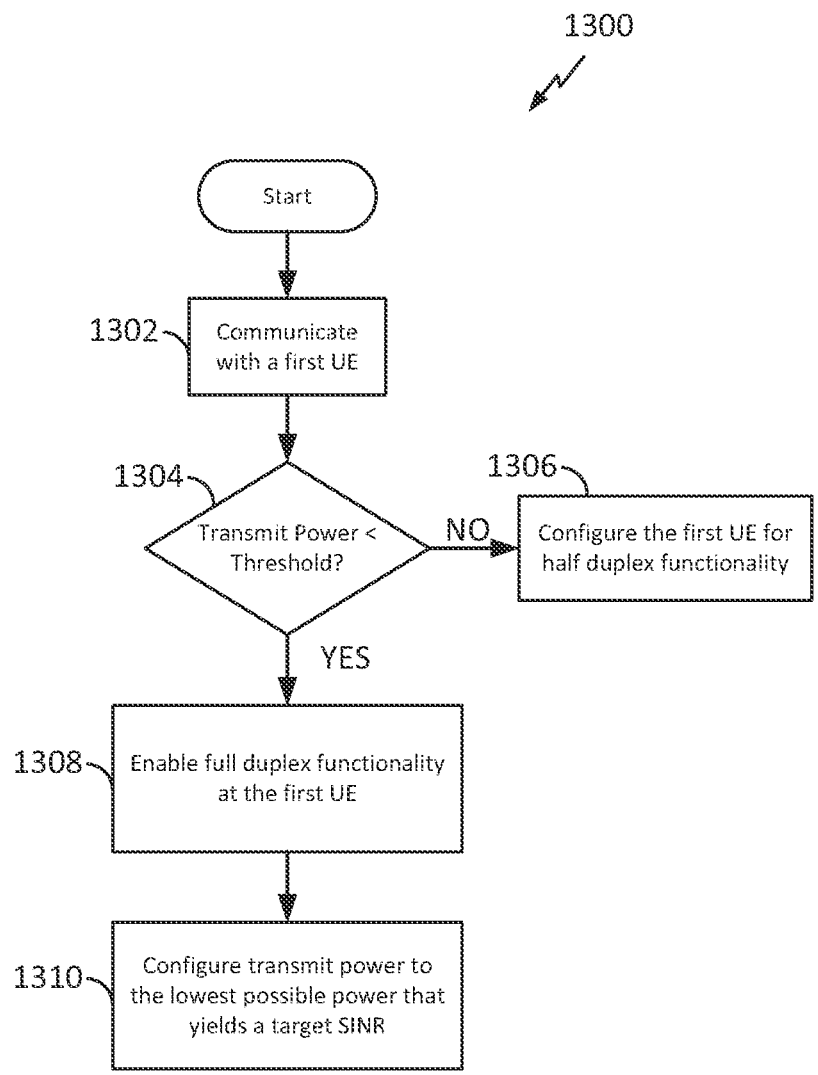
FIG. 13 is a flow chart illustrating a process of controlling a quasi-full duplex UE according to some embodiments.

FIG. 13 is a flow chart illustrating an exemplary process 1300 for determining whether to enable full duplex operation at a UE in accordance with one or more aspects of the present disclosure. In some examples, the process 1300 may be carried out by a network node such as a scheduling entity 100 and/or a processing system 114 as described above and illustrated in FIG. 1. In some examples the process 1300 may be carried out by any suitable means for implementing the described functions.

At block 1302, a device (e.g., a scheduling entity 100) may communicate with a first wireless device (e.g., a UE 200), and at block 1304 the scheduling entity 100 may determine whether a transmit power of the first UE 200 is undesirably low (e.g., being below a suitable transmit power threshold). If the transmit power is not below the transmit power threshold, then the process may proceed to block 1306 wherein the scheduling entity 100 may configure the first UE 200 for half duplex functionality. On the other hand, if the transmit power of the UE 200 is less than the transmit power threshold, then the process may proceed to block 1308, wherein the scheduling entity 100 may enable full duplex functionality at the UE 100. Further, at block 1310, the scheduling entity 100 may configure the transmit power of the full duplex-enabled UE 100 to the lowest possible transmit power that yields a suitable target SINR.

Extension to More Generalized Self Interference Cancellation Model

Figure 14:
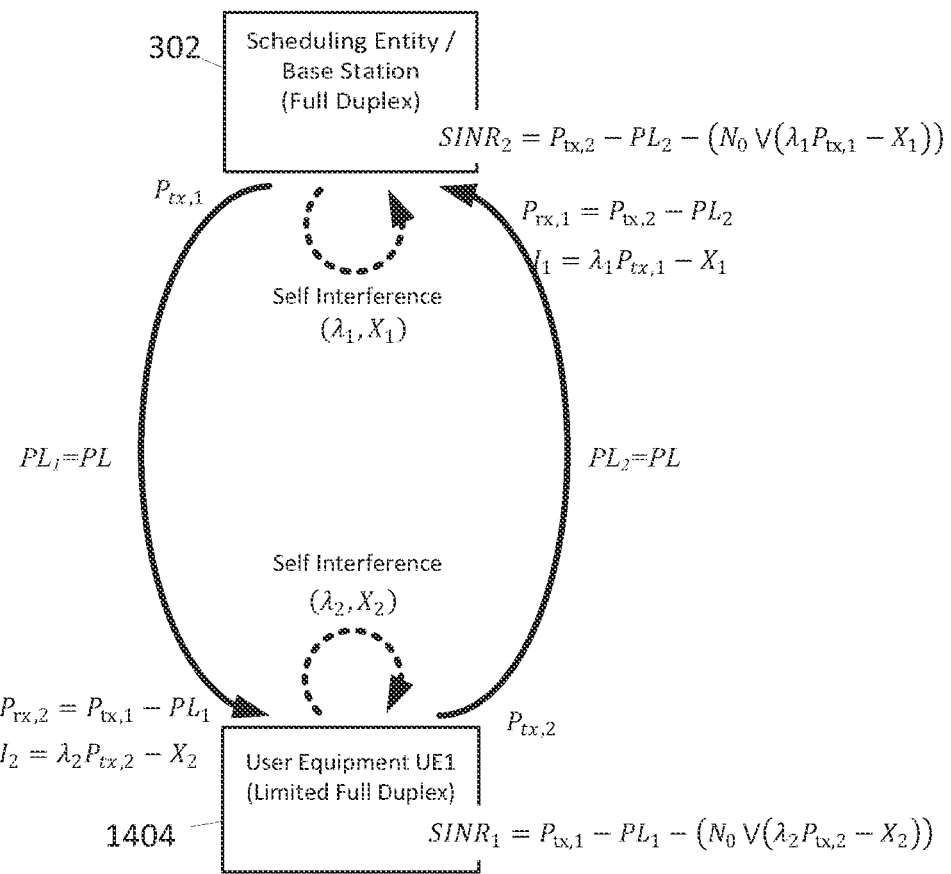
FIG. 14 is a block diagram illustrating an example of a wireless communication network including a full duplex base station and a limited full duplex UE with additional detail of generalized signal parameters according to some embodiments.

FIG. 14 is a block diagram illustrating an exemplary wireless communication system similar to the system illustrated in FIG. 12, wherein a UE 1404 is configured for limited full duplex functionality. However, in FIG. 14, the transmission characteristics illustrate a generalized model for self-interference cancellation. That is, as illustrated:

- $P_{tx,1}$ corresponds to the power of the signal transmitted from the scheduling entity 302.
- $P_{tx,2}$ corresponds to the power of the signal transmitted from the UE 1404.
- $PL_1 = PL_2 = PL$ corresponds to the path loss between the scheduling entity 302 and the UE 1404.
- $P_{rx,1}$ corresponds to the power received at the scheduling entity 302. Here, $P_{rx,1} = P_{tx,2} - PL_2$.
- $P_{rx,2}$ corresponds to the power received at the UE 1404. Here, $P_{rx,2} = P_{tx,1} - PL_1$.
- $X_1$ represents the self-interference cancellation capability at the scheduling entity 302.
- $X_2$ represents the self-interference cancellation capability at the UE 1404.
- The uncancelled self-interference power may be given by, for example, $I = (1/X) \cdot P^\lambda$. In the dB domain, this may be written as $I = \lambda P - X$.
- $\lambda_1$ and $\lambda_2$ represent the relationship between the transmission power P and the residual interference power I. In general, for many full duplex radio implementations, $0 < \lambda < 1$, although this is not necessarily the case. In the previous examples and analysis, it was assumed that $\lambda$ was equal to 1, in which case the residual interference I would be X dB less than the transmit power P. In an example where $\lambda$ were equal to 0.5, then if the transmit power P were increased by 1 dB, then the residual interference power I would increase only by 0.5 dB.
- $I_1$ corresponds to the self-interference at the scheduling entity 302, taking account of its self-interference cancellation capability. Here, a generalized model of the self-interference power may be represented by the equation $I_1 = \lambda_1 P_{tx,1} - X_1$.
- $I_1$ corresponds to the self-interference at the UE 1404, taking account of its self-interference cancellation capability. Here, a generalized model of the self-interference power may be represented by the equation $I_1 = \lambda_2 P_{tx,2} - X_2$.
- $SINR_1$ corresponds to the SINR at the UE 1404.
- $SINR_2$ corresponds to the SINR at the scheduling entity 302.

Here, $SINR_1 = P_{tx,1} - PL - (N_0 V(\lambda_2 P_{tx,2} - X_2))$; and $SINR_2 = P_{tx,2} - PL - (N_0 V(\lambda_1 P_{tx,1} - X_1))$. In an aspect of the disclosure, full duplex capabilities at the UE 1404 may be enabled under certain feasibility conditions relating to one or both of $SINR_1$ and/or $SINR_2$, e.g., whether one or both are at or above given threshold values. For example, full duplex may be enabled when $SINR_1 \geq SINR_{1,min}$; and when $SINR_2 \geq SINR_{2,min}$.

Feasibility Conditions for Full Duplex Operation with a Single UE, with Generalized Self-Interference Model Based on the SINR analysis of the transmitted signals, the minimum transmit power at the scheduling entity 302 and the UE 1404 might benefit from satisfying the following inequalities:

$$SINR_{1,min} + PL_1 + (N_0 V(\lambda_2 P_{tx,2} - X_2)) \leq P_{tx,1} \leq P_{tx,1,max}; \text{ and} \quad (1''')$$

$$SINR_{2,min} + PL_2 + (N_0 V(\lambda_1 P_{tx,1} - X_1)) \leq P_{tx,2} \leq P_{tx,2,max}, \quad (2''')$$

where $PL_1 = PL_2 = PL$.

In the above disclosure, prior to generalizing, the case where $\lambda_1 = \lambda_2 = 1$ has already been addressed. Therefore, it suffices to consider $\lambda_1 \leq 1$, $\lambda_2 \leq 1$, and $\lambda_1 \lambda_2 < 1$. In these cases, a feasible power allocation may exist as long as:

$$P_{tx,1,max} - PL_1 - (N_0 V(\lambda_2 (SINR_{2,min} + PL_2 + (N_0 V(\lambda_1 P_{tx,1,max} - X_1))) - X_2)) \geq SINR_{1,min}.$$

$$P_{tx,2,max} - PL_2 - (N_0 V(\lambda_1 (SINR_{1,min} + PL_1 + (N_0 V(\lambda_2 P_{tx,2,max} - X_2))) - X_1)) \geq SINR_{2,min}.$$

Another way to express the above may be to generate feasibility functions. For example, by subtracting $SINR_{1,min}$ from both sides, a first feasibility function $f_1(\ )$ may be obtained:

$$P_{tx,1,max} - PL_1 - (N_0 V(\lambda_2 (SINR_{2,min} + PL_2 + (N_0 V(\lambda_1 P_{tx,1,max} - X_1))) - X_2)) - SINR_{1,min} \geq 0.$$

Here, $f_1(\ ) = P_{tx,1,max} - PL_1 - (N_0 V(\lambda_2 (SINR_{2,min} + PL_2 + (N_0 V(\lambda_1 P_{tx,1,max} - X_1))) - X_2)) - SINR_{1,min}$, and the feasibility condition may be satisfied if $f_1(\ ) \geq 0$.

Similarly, a second feasibility function $f_2(\ )$ may be obtained as follows:

$$P_{tx,2,max} - PL_2 - (N_0 V(\lambda_1 (SINR_{1,min} + PL_1 + (N_0 V(\lambda_2 P_{tx,2,max} - X_2))) - X_1)) \, SINR_{2,min} \geq 0.$$

Here, $f_2(\ ) = P_{tx,2,max} - PL_2 - (N_0 V(\lambda_1 (SINR_{1,min} + PL_1 + (N_0 V(\lambda_2 P_{tx,2,max} - X_2))) - X_1)) \, SINR_{2,min}$, and the feasibility condition may be satisfied if $f_2(\ ) \geq 0$.

As expected, the left-hand side of the above inequalities may be increased by decreasing $PL_1 (= PL_2 = PL)$ and/or $SINR_{1,min}/SINR_{2,min}$, or by increasing $X_1$ or $X_2$. In other words, feasibility conditions may be facilitated by reducing one or more of $SINR_{1,min}$, $SINR_{2,min}$, $PL_1 (= PL_2 = PL)$, or by increasing one or more of $X_1$ or $X_2$. This implies that the qualitative behavior of the scheduling entity 302 is the same as that in the original interference model. That is, the scheduling entity 302 may reduce path loss(es) through judicious user selection, or may decrease the target SINR(s) through judicious selection of data rate or data type (e.g., traffic vs. control).

Full Duplex Capability Reporting

In a further aspect of the disclosure, in order to facilitate the full duplex operation between a scheduling entity 302 and a UE 1404, the UE 1404 may declare (e.g., by transmitting a corresponding information element) one or more interference cancellation capability parameters 254, such as its self-interference cancellation factor ($\lambda_2$, $X_2$), to the scheduling entity 302. In some examples, this declaration may be part of the UE category reporting, or in another example, this declaration may be a separate capability attribute.

Furthermore, because the value of ($\lambda_2$, $X_2$) may further depend on the power amplifier state at the UE 1404 (e.g., ON or OFF), the UE 1404 may declare a list/array/table of interference cancellation capability parameters ($\lambda_2$, $X_2$), e.g., one (pair of) value(s) per power amplifier state. In addition, in some examples, the UE 1404 may report its power amplifier state or path loss on a regular basis, so that the scheduling entity 302 may determine the extent of interference cancellation that may be performed by the UE 1404 in a given state/configuration.

Figure 15:
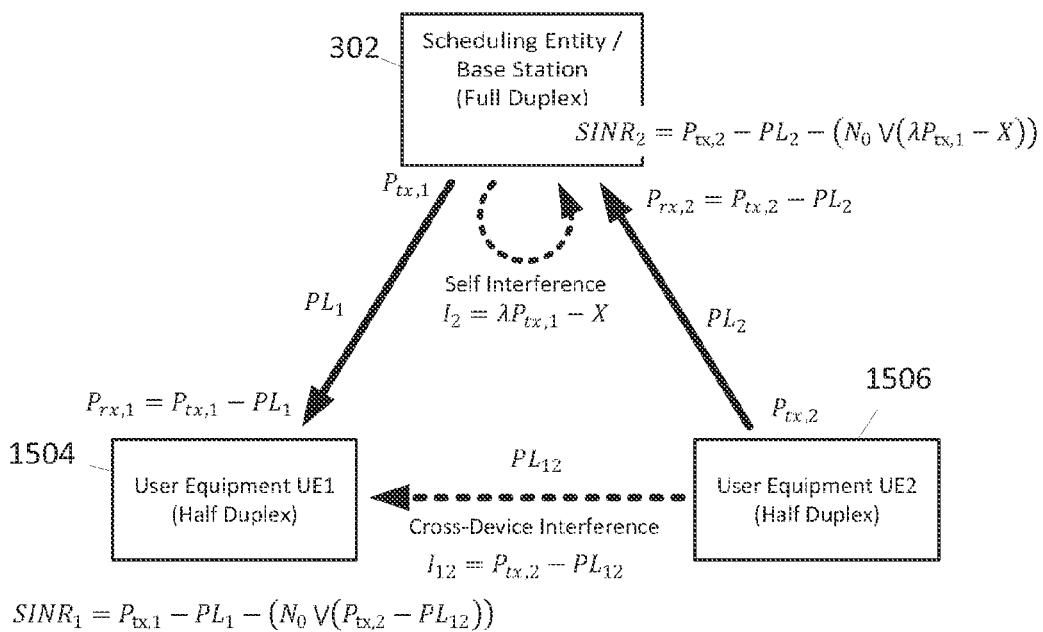
FIG. 15 is a block diagram illustrating an example of a wireless communication network including a full duplex base station and half duplex UEs with additional detail of generalized signal parameters according to some embodiments.
Figure 16:
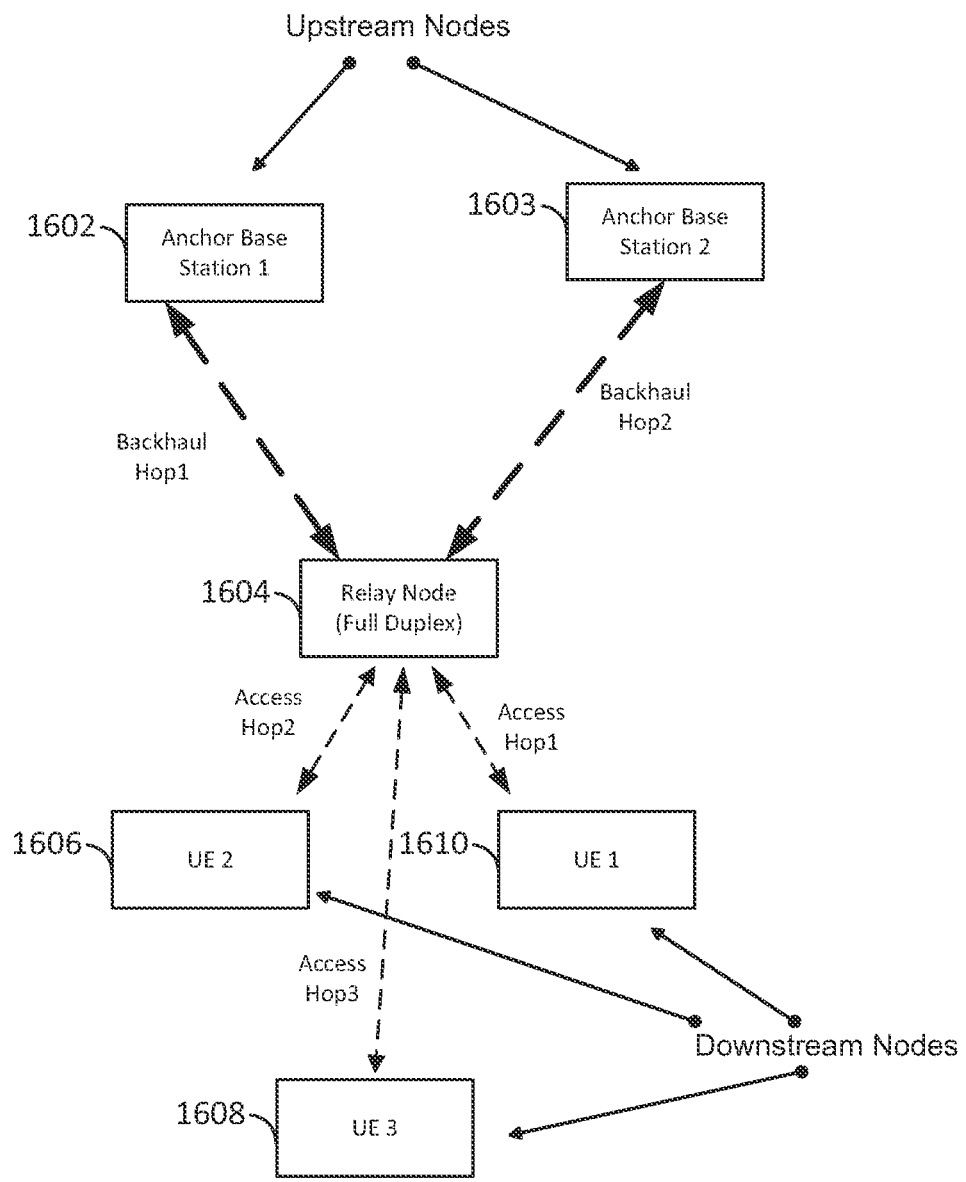
FIG. 16 is a block diagram illustrating an example of a wireless communication network including an intermediate relay node operating in full duplex mode between a plurality of anchor base stations and a plurality of terminal UEs, in accordance with some embodiments.

Revisiting a Full Duplex Base Station Serving Two Half Duplex UEs, with Extended/Generalized Model for Self-Interference Cancellation at the Base Station FIG. 15 is a block diagram of a wireless communication network including two half duplex UEs UE1, 1504 and UE2, 1506, wherein the illustrated communication parameters correspond to the extended or generalized model for self-interference cancellation at the full duplex scheduling entity 302. In this illustration:

$P_{tx,1}$ represents the transmitted power from the scheduling entity 302;

$P_{tx,2}$ represents the transmitted power from UE2, 1506;

$P_{rx,1}$ represents the received power at UE1, 1504, corresponding to the transmission from the scheduling entity 302;

$I_2 = \lambda P_{tx,1} - X$ represents self-interference at the scheduling entity 302;

$I_{12} = P_{tx,2} - PL_{12}$ represents the cross-device interference power received at UE1, 1504, corresponding to the transmission from UE2, 1506;

$PL_1$ represents the path loss corresponding to a transmission from the scheduling entity 302 to UE1, 1504;

$PL_2$ represents the path loss corresponding to a transmission from UE2, 1506, to the scheduling entity 302;

$PL_{12}$ represents the path loss corresponding to a transmission from UE2, 1506, to UE1, 1504;

$SINR_1$ represents the SINR detected at UE1, 1504;

$SINR_2$ represents the SINR detected at the scheduling entity 302;

$X$ represents the magnitude of interference suppression at the scheduling entity 302; and $N_0$ represents noise.

The analysis of this scenario may be considered a special case of the analysis presented above, in relation to FIG. 14, for the single full duplex UE case. However, here, $\lambda_1 = \lambda$, $\lambda_2 = 1$, $X_1 = X$, $X_2 = PL_{12}$.

Furthermore, in this illustration, the path losses $PL_1$ and $PL_2$ may be different from one another. This results in the following. The above disclosure has addressed the case where $\lambda = 1$. Accordingly, it should suffice to consider $\lambda < 1$. In this case, a feasible power allocation exists as long as:

$P_{tx,1,max} - PL_1 - (N_0 V(SINR_{2,min} + PL_2 + (N_0 V(\lambda P_{tx,1,max} - X)) - PL_{12})) \geq SINR_{1,min}$; and $P_{tx,2,max} - PL_2 - (N_0 V(\lambda(SINR_{1,min} + PL_1 + (N_0 V(\lambda_2 P_{tx,2,max} - PL_{12}))) - X)) \geq SINR_{2,min}$.

As in the single-UE scenario, described above in connection with FIG. 14, the generalized model illustrated in FIG. 15 leads to the qualitative behavior of the scheduling entity 302 as that in the original interference model. That is, the scheduling entity 302 may reduce path loss(es) through judicious user selection, or decrease the target SINR(s) through judicious selection of data rate or data type (traffic vs. control).

Extension to Multi-Hop Networks

Above, the disclosure has basically been limited to the discussion of a radio level full duplex capable scheduling entity 302 (e.g., a base station) transmitting to a first UE and receiving from a second UE at the same time, on the same frequency channel/band. However, the present disclosure is broadly not limited thereto. That is, referring now to FIG. 16, in some aspects of the disclosure the concepts described herein may be generalized to apply to a multi-hop/mesh system, where the full duplex node is an intermediate node 1604 in a multi-hop/relay network that receives data from an upstream node and transmits data to a downstream node. Here, the upstream node may be a base station 1602/1603, a UE, or even another relay node. Similarly, the downstream node may be a UE 1606/1610, or another relay node. In some examples, the intermediate node (e.g., the relay 1604) may have connectivity not only with multiple downstream nodes (e.g., a plurality of UEs), but also with multiple upstream nodes (e.g., a plurality of anchor base stations).

In one particular example, the relay node 1604 may carry downlink data from an upstream node such as the anchor base station 1602, to a downstream node such as the UE 1606. In another example, the same relay node 1604 may carry uplink data from a downstream node such as UE 1606, to an upstream node such as the anchor base-station 1602. In these examples, the relay node 1604 may have a radio level full duplex capability, but the other upstream/downstream nodes may or may not have such full duplex capabilities. In other words, the anchor base-station(s) and UE(s) may be half duplex, full duplex, or limited full duplex, as described above.

In various aspects of the disclosure, the relay node 1604 may engage in full duplex operation in any of several different ways, with several examples being illustrated in FIGS. 17, 18, 19, 20, 21, and 22.

Figure 17:
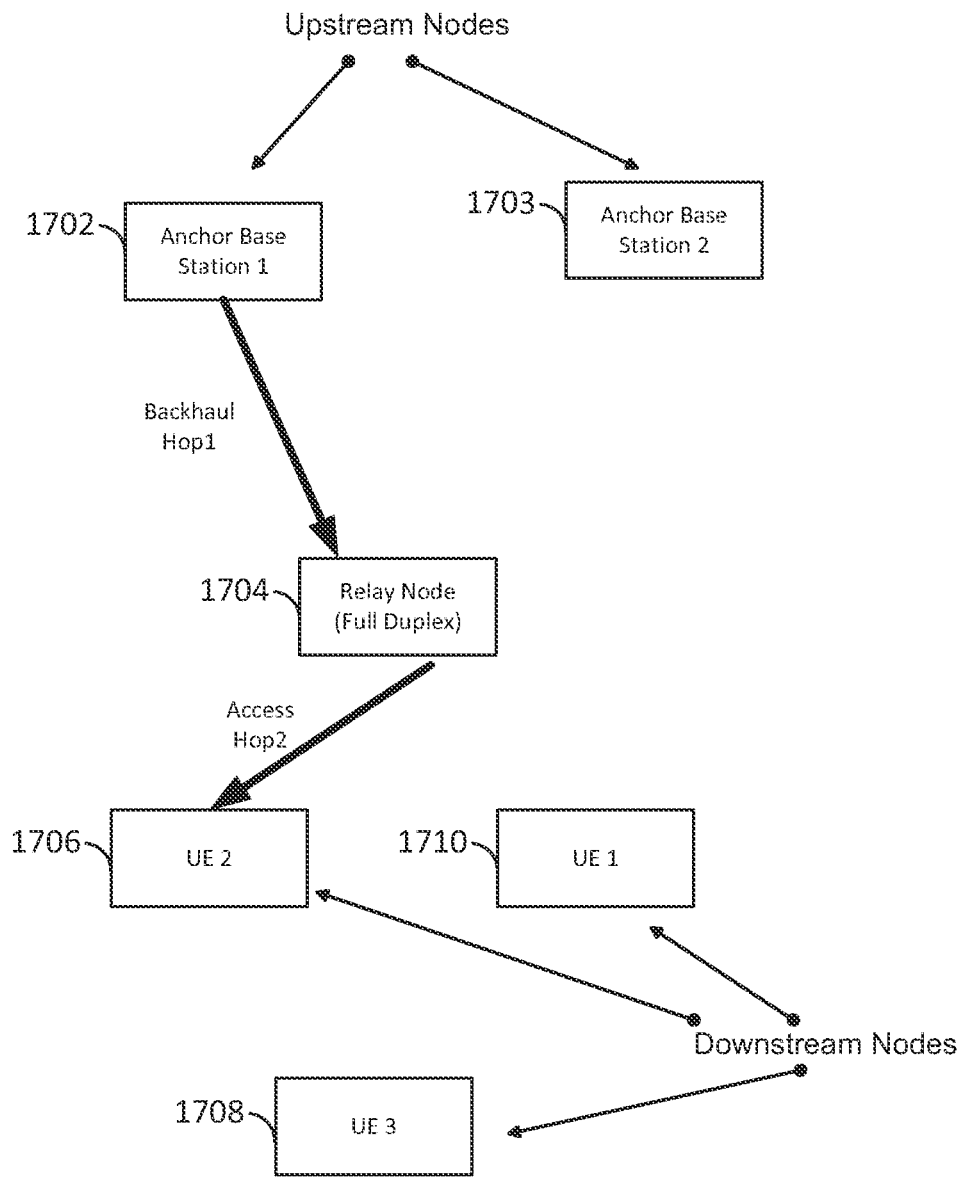
FIG. 17 is a block diagram illustrating an example of a wireless communication network including a relay node receiving downlink data from an anchor base station and transmitting the downlink data to a UE in accordance with some embodiments.

For example, FIG. 17 illustrates a wireless communication system wherein a relay node 1704 may simultaneously (and on the same frequency channel/band) receive downlink data from an anchor base station 1702 and transmit downlink data to a UE 1706.

Figure 18:
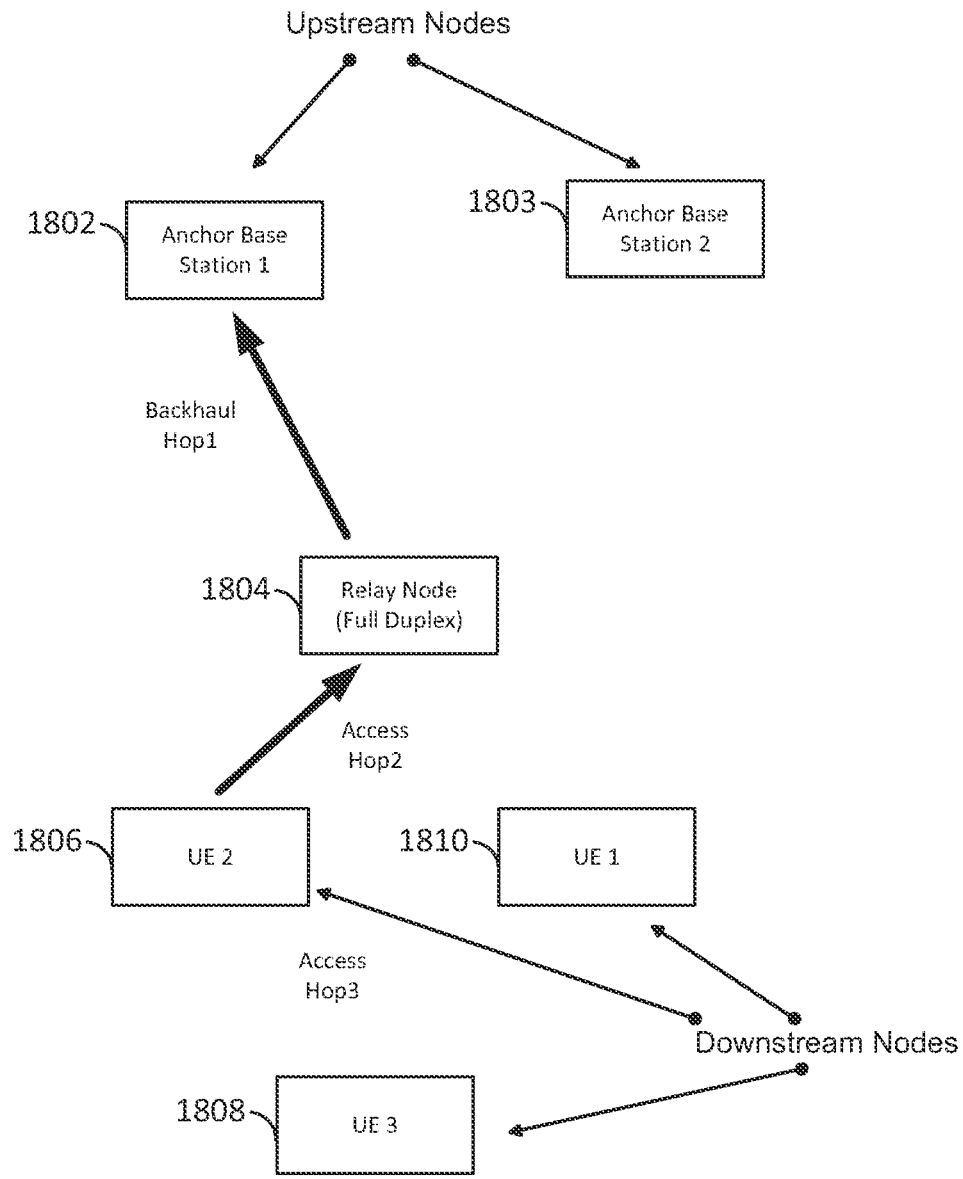
FIG. 18 is a block diagram illustrating an example of a wireless communication network including a relay node receiving uplink data from a UE and transmitting the uplink data to an anchor base station in accordance with some embodiments.

FIG. 18 illustrates a wireless communication system according to another example, wherein a relay node 1804 may simultaneously (and on the same frequency channel/band) receive uplink data from a UE 1806 and transmit uplink data to an anchor base station 1802.

Figure 19:
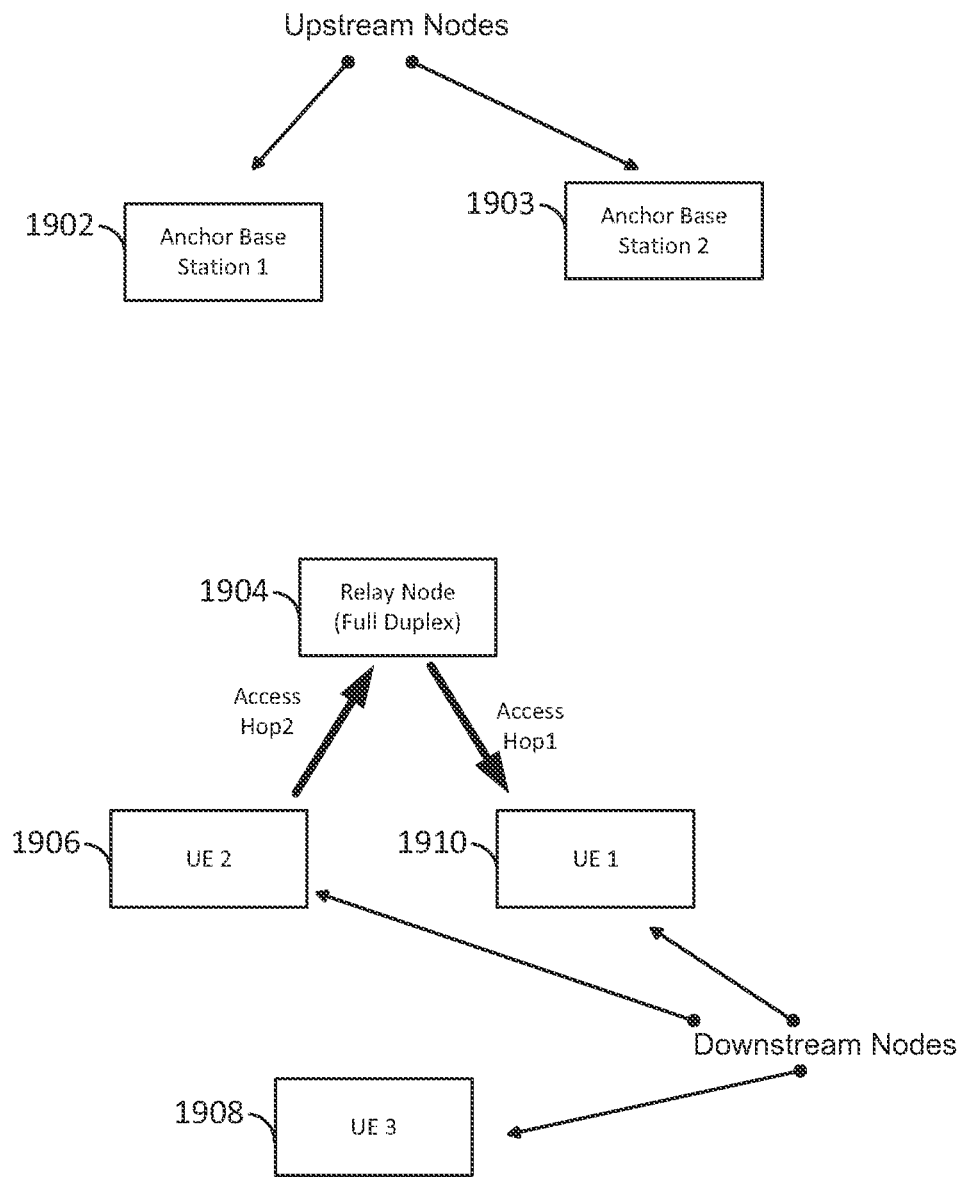
FIG. 19 is a block diagram illustrating an example of a wireless communication network including a relay node transmitting downlink data to a first UE and receiving uplink data from a second UE in accordance with some embodiments.

FIG. 19 illustrates a wireless communication system according to still another example, wherein a relay node 1904 may simultaneously (and on the same frequency channel/band) transmit downlink data to UE 1910 and receive uplink data from another UE 1906.

Figure 20:
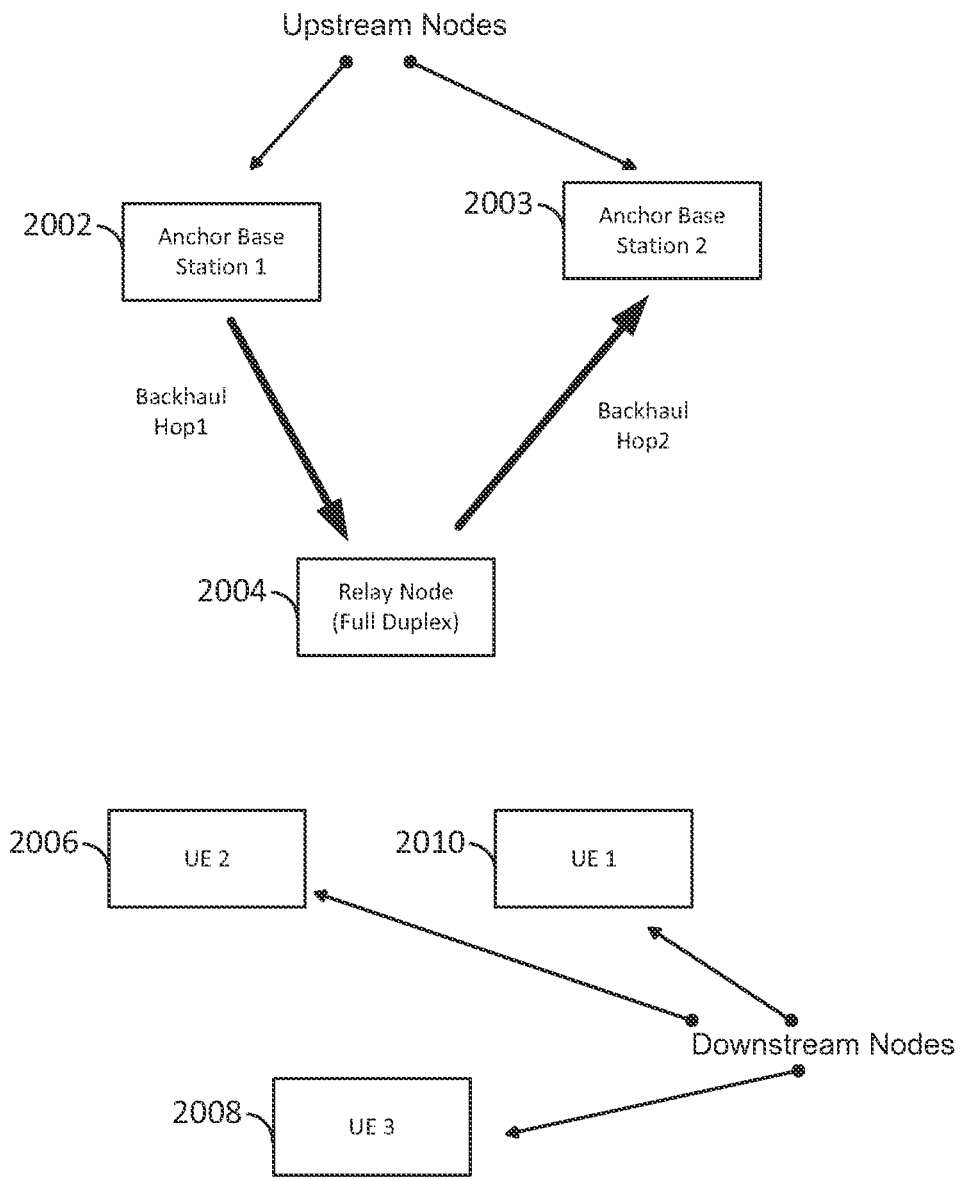
FIG. 20 is a block diagram illustrating an example of a wireless communication network including a relay node receiving downlink data from a first base station and transmitting uplink data to a second base station in accordance with some embodiments.

FIG. 20 illustrates a wireless communication system according to still another example, wherein a relay node 2004 may simultaneously (and on the same frequency channel/band) receive downlink data (destined for some UE) from an anchor base station 2002 and transmit uplink data (originating from some other UE) to another anchor base station 2003.

Figure 21:
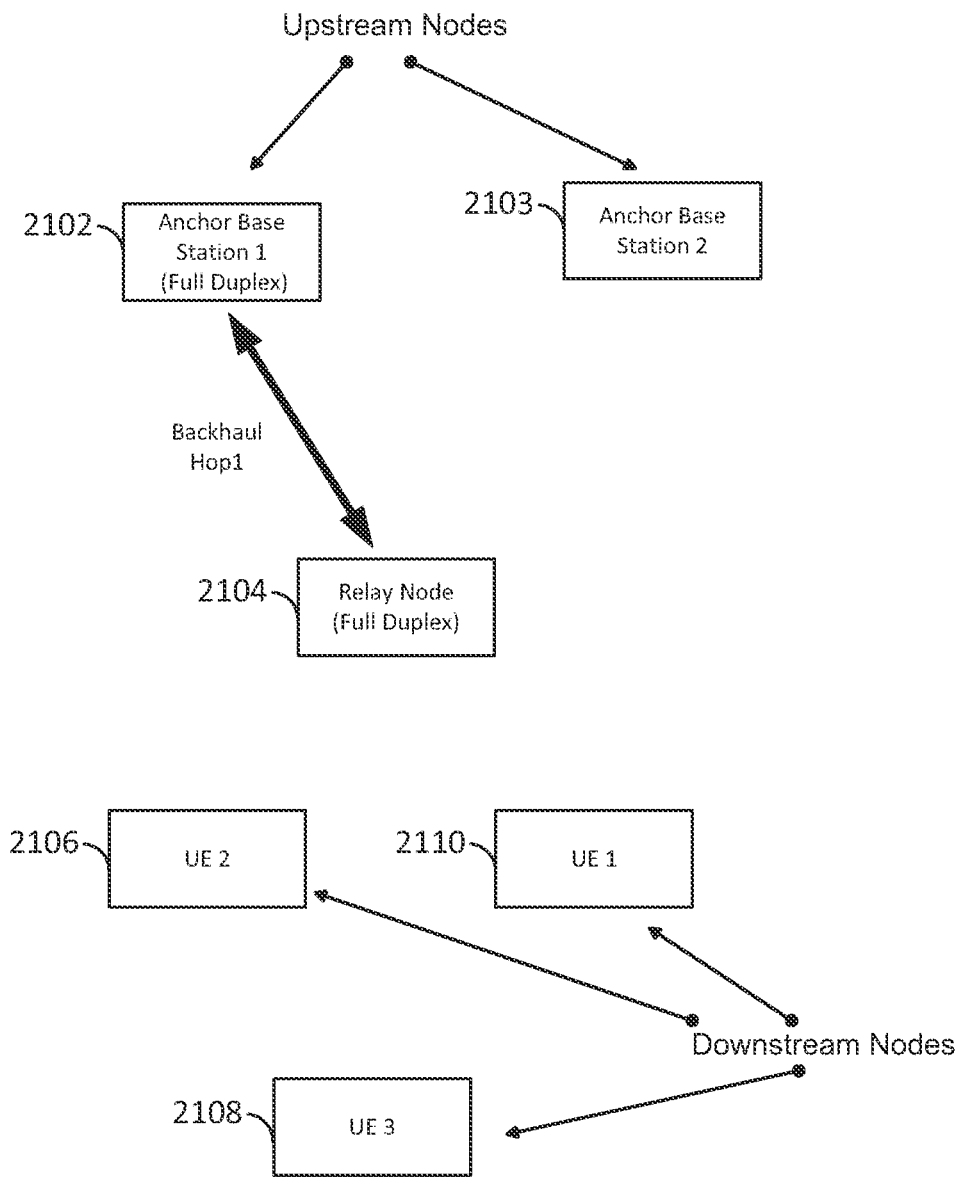
FIG. 21 is a block diagram illustrating an example of a wireless communication network including a relay node transmitting and receiving data to/from a full duplex base station in accordance with some embodiments.

FIG. 21 illustrates a wireless communication system according to still another example, wherein a relay node 2104 may simultaneously (and on the same frequency channel/band) transmit and receive data to/from the same anchor base station 2102, provided the anchor base station also has a radio level full duplex capability.

Figure 22:
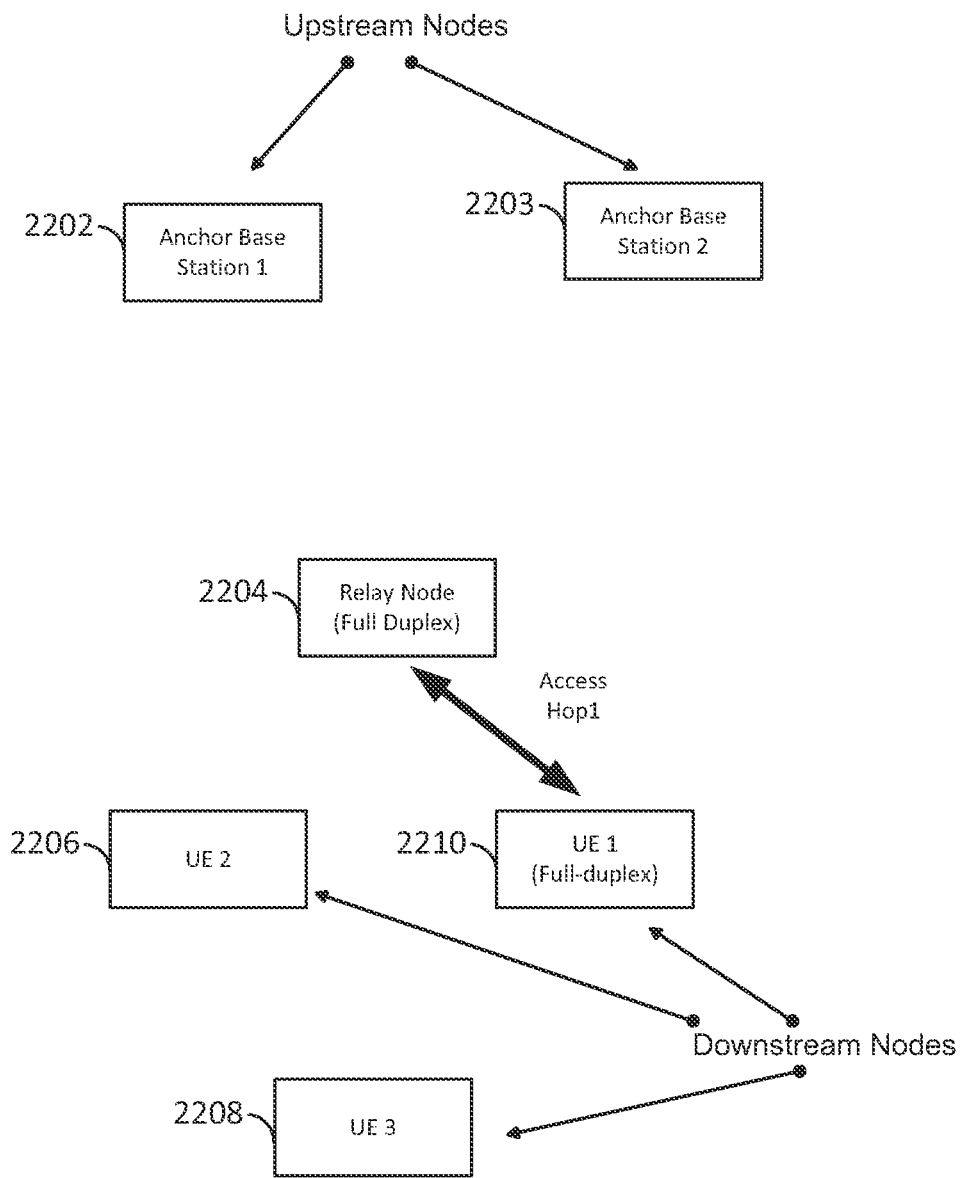
FIG. 22 is a block diagram illustrating an example of a wireless communication network including a relay node transmitting and receiving data to/from a full duplex UE in accordance with some embodiments.

FIG. 22 illustrates a wireless communication system according to yet another example, wherein a relay node 2204 may simultaneously (and on the same frequency channel/band) transmit and receive data to/from the same UE 2210, provided the UE also has a radio level full duplex capability.

In summary, the two co-scheduled links in the full duplex operation may be associated with any suitable number of nodes (e.g., one or more) on the downstream, and any suitable number of nodes (e.g., one or more) on the upstream. If an upstream/downstream node also has a full duplex capability, then the two co-scheduled links may be associated with the same upstream/downstream node.

In all these cases, the relay node 1604 may operate in full duplex mode on the access hops (i.e., the radio link between the relay node 1604 and the terminal UE 1606), or on the backhaul hops (i.e., the radio link between the relay node 1604 and its anchor base station 1602) or across an access hop and a backhaul hop if the associated path losses, SINR targets, and self-interference cancellation parameters satisfy the feasibility conditions described in the previous sections. Otherwise, as described in the examples above, the relay node 1604 may use time or frequency division duplexing to operate on the two links. The considerations regarding user selection, SINR target selection (through selection of the appropriate data rate or data type, i.e., user traffic vs. control signaling such as CQI/ACK/REQ) that may be used to facilitate the feasibility conditions for full duplex operation, may carry over almost verbatim to this case of relay operation.

In a further aspect of the disclosure, the same type of feasibility conditions and considerations for full duplex operation described above may apply to more general multi-hop/mesh systems with full duplex capabilities at any number of intermediate nodes, even though the distinction between backhaul hop vs. anchor hop, as well as the distinction between anchor base station and terminal UE, may be blurred in these mesh-based communication systems. In particular, an intermediate node with a radio level full duplex capability may co-schedule an upstream node and downstream node, so as to transmit data/control to one of them and receive data/control from the other simultaneously, as long as the associated path losses, self-interference cancellation/rejection parameters ($\lambda$ and X), and link SINR targets satisfy the feasibility conditions. As before, the scheduling entity (which may be hosted on the intermediate node, or another controlling node, such as an anchor base station) may vary the path loss parameters through appropriate selection of the upstream/downstream node(s), while the SINR targets may be changed through an appropriate selection of data rate and/or data type (e.g., traffic vs. control). If the feasibility conditions for co-channel full duplex conditions can not be met, the scheduling entity may consider quasi-duplex operation (on different channels/subchannels in the same frequency band), or fall back to half duplex operation as needed.

CONCLUSION

As described above, one or more aspects of the disclosure provide for a wireless communication system wherein a full duplex node (e.g., a scheduling entity) may wirelessly communicate with one or more other nodes or devices. Here, the full duplex node may determine the path loss $\{PL_k\}$ between itself and the devices it communicates with. The path loss $\{PL_k\}$ may be determined in any suitable fashion, many of which are described above.

In some examples, the full duplex node may determine, directly and/or indirectly, the inter-device path loss $\{PL_{i,j}\}$ between pairs of devices with which it communicates. The inter-device path loss $\{PL_{i,j}\}$ may be determined in any suitable fashion, many of which are described above.

The full duplex node may determine certain target SINR values for multiple links between itself and one or more of the devices it communicates with. Furthermore, the full duplex node may determine one or more feasibility functions $f_n(\ )$ involving the path loss between itself and a pair of devices, the path loss between that pair of devices, as well as target SINR values for multiple links involving the full duplex node and the pair of devices. In some cases, the two devices may be one and the same. In this case, self-interference cancellation parameters of the device take the place of inter-device path loss.

In some examples, if all the feasibility functions have a positive value, the pair of devices may be selected for full duplex co-scheduling. In some aspects of the disclosure, each feasibility function $f_n(\ )$ may be a non-increasing or decreasing function of the path losses, and target SINR.

In some aspects of the disclosure, the path loss terms that go into the feasibility functions may be changed by considering different pairs of UEs for full duplex co-scheduling. In still further aspects, the target SINR of the links in question may be changed by considering different modulation and coding schemes (MCS), or traffic types (e.g., user data vs. control/signaling).

In a still further aspect of the disclosure, a pair of UEs that are not compatible for full duplex scheduling may be considered for quasi full duplex scheduling, on different/neighboring channels/subchannels in the same band.

As those skilled in the art will readily appreciate, various aspects described throughout this disclosure may be extended to any suitable telecommunication systems, network architectures and communication standards. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 5, 9, 10, 12, 14, 15, 16, 17, 18, 19, 20, 21, and/or 22 may be configured to perform one or more of the methods, features, or steps described herein and illustrated in FIGS. 4, 6, 7, 8, 11, and/or 13. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a network node, comprising:
   communicating with a first device and a second device, by utilizing half duplex communication with each of the first device and the second device;
   determining an inter-device path loss between the first device and the second device; and
   co-scheduling the first device and the second device to utilize a first time-frequency resource if the inter-device path loss between the first device and the second device is greater than a threshold.

2. The method of claim 1, further comprising:
   allocating a resource for the first device to utilize to transmit an interference discovery signal to the second device; and
   transmitting a signal indicative of the allocated resource to the first device.

3. The method of claim 2, further comprising:
   randomly changing a time-frequency location of the allocated resource over a series of slots until the inter-device path loss between each pair from among a plurality of pairs of devices is determined.

4. The method of claim 2, further comprising selecting a subset of devices from among a plurality of devices for transmitting the interference discovery signal, the first device being part of the subset, wherein the subset is randomly selected from among the plurality of devices.

5. The method of claim 2, wherein the resource allocated to the first device corresponds to an identifier unique to the first device.

6. The method of claim 1, wherein the determining an inter-device path loss comprises:
   determining a distance between the first device and the second device; and
   inferring the inter-device path loss according to the distance.

7. The method of claim 1, wherein the co-scheduling of the first device and the second device is further in accordance with a determination of a path loss between the first and second devices, and the network node.

8. The method of claim 1, wherein the network node comprises a relay node configured to communicate with an upstream node utilizing a backhaul communication interface.

9. A method of wireless communication operable at a user equipment (UE), comprising:
   communicating with a network node utilizing half duplex communication;
   receiving an interference discovery signal from an interfering UE;
   transmitting an interference report to the network node corresponding to a strength of the received interference discovery signal; and
   receiving a resource allocation from the network node, wherein the resource allocation is co-scheduled with the interfering UE only if a path loss, corresponding to the strength of the received interference discovery signal, is greater than a threshold.

10. The method of claim 9, wherein the receiving an interference discovery signal comprises receiving uplink transmissions from interfering UEs during a time-frequency resource for which the UE is not scheduled for uplink transmission; and
    wherein the transmitting an interference report comprises reporting the time-frequency resource in which the uplink transmissions were received.

11. The method of claim 10, further comprising:
    enabling full duplex communication at the UE if a configured transmit power for the UE is less than a transmit power threshold.

12. The method of claim 11, further comprising receiving a grant to transmit at a lowest possible power that yields a target signal-to-interference-and-noise ratio.

13. The method of claim 9, further comprising: transmitting an information element corresponding to one or more interference cancellation capability parameters, wherein the interference cancellation capability parameters indicate an interference cancellation capability of the UE.

14. A network node configured for wireless communication, comprising:
    at least one processor;
    a computer-readable medium communicatively coupled to the at least one processor; and a transceiver communicatively coupled to the at least one processor,
wherein the at least one processor is configured to:
utilize the transceiver to communicate with a first device and a second device, by utilizing half duplex communication with each of the first device and the second device;
determine an inter-device path loss between the first device and the second device; and
co-schedule the first device and the second device to utilize a first time-frequency resource if the inter-device path loss between the first device and the second device is greater than a threshold.

15. The network node of claim 14, wherein the at least one processor is further configured to:
allocate a resource for the first device to utilize to transmit an interference discovery signal to the second device; and
utilize the transceiver to transmit a signal indicative of the allocated resource to the first device.

16. The network node of claim 15, wherein the at least one processor is further configured to:
randomly change a time-frequency location of the allocated resource over a series of slots until the inter-device path loss between each pair from among a plurality of pairs of devices is determined.

17. The network node of claim 15, wherein the at least one processor is further configured to select a subset of devices from among a plurality of devices for transmitting the interference discovery signal, the first device being part of the subset, wherein the subset is randomly selected from among the plurality of devices.

18. The network node of claim 15, wherein the resource allocated to the first device corresponds to an identifier unique to the first device.

19. The network node of claim 14, wherein the at least one processor, being configured to determine an inter-device path loss, is further configured to:
determine a distance between the first device and the second device; and
infer the inter-device path loss according to the distance.

20. The network node of claim 14, wherein the at least one processor is further configured to:
determine a single-device path loss between a wireless device and the network node.

21. The network node of claim 14, wherein the at least one processor, being configured to co-schedule the first device and the second device, is further configured to co-schedule the first device and the second device in accordance with a determination of a path loss between the first and second devices, and the network node.

22. The network node of claim 14, wherein the at least one processor, being configured to co-schedule the first device and the second device, is further configured to co-schedule the first device and the second device in accordance with a data rate and/or a data type utilized by at least one of the first device or the second device.

23. The network node of claim 14, wherein the network node comprises a base station.

24. The network node of claim 14, wherein the network node comprises a relay node configured to communicate with an upstream node utilizing a backhaul communication interface.

25. A user equipment (UE) configured for wireless communication, comprising:
at least one processor;
a computer-readable medium communicatively coupled to the at least one processor; and
a transceiver communicatively coupled to the at least one processor,
wherein the at least one processor is configured to:
utilize the transceiver to communicate with a network node utilizing half duplex communication;
utilize the transceiver to receive an interference discovery signal from an interfering UE;
utilize the transceiver to transmit an interference report to the network node corresponding to a strength of the received interference discovery signal; and
utilize the transceiver to receive a resource allocation from the network node, wherein the resource allocation is co-scheduled with the interfering UE only if a path loss, corresponding to the strength of the received interference discovery signal, is greater than a threshold.

26. The UE of claim 25, wherein the at least one processor, being configured to receive an interference discovery signal, is further configured to utilize the transceiver to receive uplink transmissions from interfering UEs during a time-frequency resource for which the UE is not scheduled for uplink transmission; and
wherein the at least one processor, being configured to transmit an interference report, is further configured to report the time-frequency resource in which the uplink transmissions were received.

27. The UE of claim 26, wherein the at least one processor is further configured to:
enable full duplex communication at the UE if a configured transmit power for the UE is less than a transmit power threshold.

28. The UE of claim 27, wherein the at least one processor is further configured to utilize the transceiver to receive a grant to transmit at a lowest possible power that yields a target signal-to-interference-and-noise ratio.

29. The UE of claim 25, wherein the at least one processor is further configured to:
enable full duplex communication at the UE if a signal to interference and noise ratio is greater than a threshold.

30. The UE of claim 25, wherein the at least one processor is further configured to utilize the transceiver to transmit an information element corresponding to one or more interference cancellation capability parameters, wherein the interference cancellation capability parameters indicate an interference cancellation capability of the UE.

* * * * *